(12) United States Patent
Duan et al.

(10) Patent No.: US 11,272,439 B2
(45) Date of Patent: Mar. 8, 2022

(54) CORE NETWORK SELECTION METHOD, APPARATUS, AND SYSTEM

(71) Applicant: HUAWEI TECHNOLOGIES CO., LTD., Guangdong (CN)

(72) Inventors: Xiaoyan Duan, Shenzhen (CN); Hui Jin, Beijing (CN); Qiang Yi, Beijing (CN); Yue He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 16/789,711

(22) Filed: Feb. 13, 2020

(65) Prior Publication Data
US 2020/0280911 A1 Sep. 3, 2020

Related U.S. Application Data

(63) Continuation of application No. 15/760,897, filed as application No. PCT/CN2015/089929 on Sep. 18, 2015, now Pat. No. 10,588,074.

(51) Int. Cl.
*H04W 48/18* (2009.01)
*H04W 36/00* (2009.01)
(Continued)

(52) U.S. Cl.
CPC ....... *H04W 48/18* (2013.01); *H04W 36/0027* (2013.01); *H04W 36/04* (2013.01);
(Continued)

(58) Field of Classification Search
CPC ............... H04W 48/18; H04W 48/12; H04W 36/0027; H04W 36/04; H04W 36/165; H04W 48/20; H04W 84/00; H04W 8/04
(Continued)

(56) References Cited

U.S. PATENT DOCUMENTS 10,880,740 B2 * 12/2020 Kall ................... H04L 63/08
2010/0027468 A1 2/2010 Rajadurai et al.
(Continued)

FOREIGN PATENT DOCUMENTS

CN 101267397 A 9/2008
CN 102098760 A 6/2011
(Continued)

OTHER PUBLICATIONS

S2-152661 Ericsson,"New SID: Study on Enhancements of Dedicated Core Networkselection mechanism",3GPP TSG SA WG-2 Meeting #110,Dubrovnik, Croatia, Jul. 6-10, 2015,total 5 pages.
(Continued)

*Primary Examiner* — Candal Elpenord

(57) ABSTRACT

Embodiments provide a core network selection method, an apparatus, and a system. The method includes the following steps: obtaining first dedicated core network (DCN) information from an access network device, where the first DCN information includes information about at least one DCN that can be accessed by the access network device. The method also includes selecting a to-be-accessed DCN from the at least one DCN according to the first DCN information, and sending information about the to-be-accessed DCN to the access network device, so that the access network device determines a core network device according to the information about the to-be-accessed DCN.

17 Claims, 15 Drawing Sheets

Send first DCN information to UE, so that the UE selects a to-be-accessed DCN according to the first DCN information, where the first DCN information includes information about at least one DCN that can be accessed by an access network device ~ 201

Receive information about the to-be-accessed DCN sent by the UE ~ 202

Determine a core network device according to the information about the to-be-accessed DCN and preconfigured second DCN information, and initiate a service request to the core network device ~ 203

(51) Int. Cl.
*H04W 36/04* (2009.01)
*H04W 36/16* (2009.01)
*H04W 48/12* (2009.01)
*H04W 84/00* (2009.01)
*H04W 8/04* (2009.01)
*H04W 48/20* (2009.01)

(52) U.S. Cl.
CPC ............ *H04W 36/165* (2013.01); *H04W 8/04* (2013.01); *H04W 48/12* (2013.01); *H04W 48/20* (2013.01); *H04W 84/00* (2013.01)

(58) Field of Classification Search
USPC .................................................. 370/331–332
See application file for complete search history.

(56) References Cited

U.S. PATENT DOCUMENTS

| | | | |
|---|---|---|---|
| 2012/0046034 | A1 | 2/2012 | Lu et al. |
| 2014/0153481 | A1* | 6/2014 | Draznin ................ H04W 24/04 370/328 |
| 2015/0223169 | A1 | 8/2015 | Ghosh |
| 2015/0249956 | A1 | 9/2015 | Salot et al. |
| 2015/0327133 | A1 | 11/2015 | Yiu et al. |
| 2016/0164728 | A1* | 6/2016 | Chakrabarti ........ H04L 41/0806 370/254 |
| 2016/0373398 | A1* | 12/2016 | Donahoe ................ G06Q 50/10 |
| 2017/0070892 | A1 | 3/2017 | Song et al. |
| 2017/0311245 | A1* | 10/2017 | Kuge .................... H04W 48/18 |
| 2017/0374613 | A1 | 12/2017 | Ianev et al. |
| 2018/0199277 | A1 | 7/2018 | Ke et al. |
| 2018/0227841 | A1 | 8/2018 | Shimojou et al. |
| 2019/0021047 | A1* | 1/2019 | Zong ....................... H04W 8/26 |
| 2019/0037409 | A1 | 1/2019 | Wang et al. |

FOREIGN PATENT DOCUMENTS

| | | |
|---|---|---|
| CN | 102196531 A | 9/2011 |
| CN | 102843351 A | 12/2012 |
| CN | 103889004 A | 6/2014 |
| CN | 105580444 A | 5/2016 |
| EP | 2421302 A1 | 2/2012 |

OTHER PUBLICATIONS

3GPP TR 23.707 V13.0.0 (Dec. 2014),3rd Generation Partnership Project; Technical Specification Group Services and System Aspects;Architecture Enhancements for Dedicated Core Networks;Stage 2(Release 13),dated Dec. 2014,total 39 pages.

3GPP TS 23.401 V13.3.0 (Jun. 2015) 3rd Generation Partnership Project;Technical Specification Group Services and System Aspects;General Packet Radio Service (GPRS) enhancements for Evolved Universal Terrestrial Radio Access Network (E-UTRAN) access (Release 13),dated Jun. 2015,total 322 pages.

S2-151388 Samsung,"Stage 2 cleanup regarding the WIC registration with a security token",3GPP TSG-SA WG2 Meeting #108,San Jose del Cabo, Mexico, Apr. 13-17, 2015,total 3 pages.

XP050988742 S2-152670 NTT DOCOMO,"Key Issue: Selection of CIoT-specialized EPC Instance",SA WG2 Meeting #110,Dubrovnik, Croatia,Jul. 6-10, 2015,total 4 pages.

XP050983699 S2-152107 NTT DOCOMO,"Introduce the Dedicated Core Network (DECOR) feature",SA WG2 Meeting #109,May 25-29, 2015, Fukuoka, Japan,total 20 pages.

XP050942057 S2-150079 Ericsson,"Redirection at UE Initiated Initial Access",SA WG2 Meeting #107,Jan. 26-30, 2015, Sorrent,Italy,total 8 pages.

* cited by examiner

CORE NETWORK SELECTION METHOD, APPARATUS, AND SYSTEM

CROSS-REFERENCE TO RELATED APPLICATIONS

This application is a continuation of U.S. patent application Ser. No. 15/760,897, filed on Mar. 16, 2018, which is a National Stage of International Application No. PCT/CN2015/089929, filed on Sep. 18, 2015. All of the aforementioned patent applications are hereby incorporated by reference in their entireties.

TECHNICAL FIELD

Embodiments of the present invention relate to communications technologies, and in particular, to a core network selection method, an apparatus, and a system.

BACKGROUND

To meet service requirements in different scenarios, a network slicing (Network Slicing) method may be used. That is, multiple network slices constitute a network, and a single network slice may be defined as a set of logical network function entities supporting a communications service requirement in a specific scenario, for example, a network slice supporting communication of a large quantity of machine devices or a network slice supporting a mobile broadband service. There may be multiple slicing manners for network slicing. For example, a core network may be sliced, an access network may be sliced, or a core network and an access network may be sliced together. A dedicated core network (Dedicated Core Network, DCN for short) defined in the 3rd Generation Partnership Project (3rd Generation Partnership Project, 3GPP for short) is a solution for slicing a core network.

In an existing 3GPP standard solution, a core network device triggers a rerouting process of an access network device. When receiving a terminal request message sent by the access network device, such as a registration request or an update location request, a core-network control function entity may determine whether the core-network control function entity belongs to a specific DCN that serves the access network device. If no, the core-network control function entity sends information about the specific DCN of the access network device, to request the access network device to reroute the terminal request message to a core-network control function entity in the specific DCN of the access network device.

However, in the foregoing solution, the rerouting process of the access network device requires a large quantity of communication signaling interactions, increasing a processing delay and decreasing communication efficiency.

SUMMARY

Embodiments of the present invention provide a core network selection method, an apparatus, and a system, so as to improve accuracy of DCN selection by an access network device, avoid a communication signaling increase and a processing delay in a DCN reselection process, and improve communication efficiency.

According to a first aspect, an embodiment of the present invention provides a core network selection method, including:

obtaining first dedicated core network DCN information from an access network device, where the first DCN information includes information about at least one DCN that can be accessed by the access network device;

selecting a to-be-accessed DCN from the at least one DCN according to the first DCN information; and sending information about the to-be-accessed DCN to the access network device, so that the access network device determines a core network device according to the information about the to-be-accessed DCN.

With reference to the first aspect, in a first possible implementation of the first aspect, the first DCN information includes a type of the at least one DCN;

the selecting a to-be-accessed DCN from the at least one DCN according to the first DCN information includes:

selecting, from the at least one DCN, a DCN whose type matches a service type of user equipment UE, as the to-be-accessed DCN; and the sending information about the to-be-accessed DCN to the access network device, so that the access network device determines a core network device according to the information about the to-be-accessed DCN includes:

sending the type of the to-be-accessed DCN to the access network device, so that the access network device determines the core network device according to the type of the to-be-accessed DCN.

With reference to the first aspect, in a second possible implementation of the first aspect, the first DCN information includes a type, a DCN identity ID, and a priority of the at least one DCN;

the selecting a to-be-accessed DCN from the at least one DCN according to the first DCN information includes:

selecting, from the at least one DCN, one or more DCNs whose types match a service type of UE; and when a type of one DCN matches the service type, determining the one DCN as the to-be-accessed DCN; or when types of multiple DCNs match the service type, selecting the to-be-accessed DCN from the multiple DCNs according to the priority; and the sending information about the to-be-accessed DCN to the access network device, so that the access network device determines a core network device according to the information about the to-be-accessed DCN includes:

sending a DCN ID of the to-be-accessed DCN to the access network device, so that the access network device determines the core network device according to the DCN ID of the to-be-accessed DCN.

With reference to any one of the first aspect, or the first or the second possible implementation of the first aspect, in a third possible implementation of the first aspect, before the obtaining first DCN information from an access network device, the method further includes:

sending a first message to the access network device, where the first message is used to indicate a DCN selection capability of the UE; and the obtaining first DCN information from an access network device includes:

receiving a second message that is sent by the access network device according to the first message, where the second message includes the first DCN information.

With reference to the first aspect, in a fourth possible implementation of the first aspect, the first DCN information includes a type of the at least one DCN;

the selecting a to-be-accessed DCN from the at least one DCN according to the first DCN information includes:

determining a to-be-accessed public land mobile network PLMN according to a first preset rule; and selecting, from at least one DCN supported by the to-be-accessed PLMN, a DCN whose type matches a service type of UE, as the to-be-accessed DCN; and the sending information about the to-be-accessed DCN to the access network device, so that the access network device determines a core network device according to the information about the to-be-accessed DCN includes:

sending the type of the to-be-accessed DCN to the access network device, so that the access network device determines the core network device according to the type of the to-be-accessed DCN.

With reference to the first aspect, in a fifth possible implementation of the first aspect, the first DCN information includes a type of the at least one DCN;

the selecting a to-be-accessed DCN from the at least one DCN according to the first DCN information includes:

selecting, from the at least one DCN, a DCN whose type matches a service type of UE, as the to-be-accessed DCN; and determining a to-be-accessed PLMN according to the type of the to-be-accessed DCN; and the sending information about the to-be-accessed DCN to the access network device, so that the access network device determines a core network device according to the information about the to-be-accessed DCN includes:

sending the type of the to-be-accessed DCN to the access network device, so that the access network device determines the core network device according to the type of the to-be-accessed DCN.

With reference to the first aspect, in a sixth possible implementation of the first aspect, the first DCN information includes a type, a DCN ID, and a priority of the at least one DCN;

the selecting a to-be-accessed DCN from the at least one DCN according to the first DCN information includes:

determining a to-be-accessed PLMN according to a first preset rule;

selecting, from at least one DCN supported by the to-be-accessed PLMN, one or more DCNs whose types match a service type of UE; and when a type of one DCN matches the service type, determining the one DCN as the to-be-accessed DCN; or when types of multiple DCNs match the service type, selecting the to-be-accessed DCN from the multiple DCNs according to the priority; and the sending information about the to-be-accessed DCN to the access network device, so that the access network device determines a core network device according to the information about the to-be-accessed DCN includes:

sending a DCN ID of the to-be-accessed DCN to the access network device, so that the access network device determines the core network device according to the DCN ID of the to-be-accessed DCN.

With reference to the first aspect, in a seventh possible implementation of the first aspect, the first DCN information includes a type, a DCN ID, and a priority of the at least one DCN;

the selecting a to-be-accessed DCN from the at least one DCN according to the first DCN information includes:

selecting, from the at least one DCN, a DCN whose type matches a service type of UE;

determining a to-be-accessed PLMN according to the type of the DCN whose type matches the service type of the UE; and selecting, according to the priority and from at least one DCN supported by the to-be-accessed PLMN, a DCN with the highest priority as the to-be-accessed DCN; and the sending information about the to-be-accessed DCN to the access network device, so that the access network device determines a core network device according to the information about the to-be-accessed DCN includes:

sending a DCN ID of the to-be-accessed DCN to the access network device, so that the access network device determines the core network device according to the DCN ID of the to-be-accessed DCN.

With reference to any one of the first aspect, or the fourth to the seventh possible implementations of the first aspect, in an eighth possible implementation of the first aspect, the obtaining first DCN information from an access network device includes:

receiving a third message sent by the access network device, where the third message includes the first DCN information.

With reference to any one of the fourth to the eighth possible implementations of the first aspect, in a ninth possible implementation of the first aspect, before the sending information about the to-be-accessed DCN to the access network device, the method further includes:

requesting, to the access network device, to establish a wireless connection.

With reference to any one of the first aspect, or the second to the ninth possible implementations of the first aspect, in a tenth possible implementation of the first aspect, the selecting a to-be-accessed DCN from the at least one DCN according to the first DCN information further includes:

selecting a preset default DCN as the to-be-accessed DCN when the at least one DCN includes no DCN whose type matches the service type; or sending an access termination request to the access network device when the at least one DCN includes no DCN whose type matches the service type; or obtaining the first DCN information from another access network device when the at least one DCN includes no DCN whose type matches the service type.

According to a second aspect, an embodiment of the present invention provides a core network selection method, including:

sending first dedicated core network DCN information to user equipment UE, so that the UE selects a to-be-accessed DCN according to the first DCN information, where the first DCN information includes information about at least one DCN that can be accessed by the access network device;

receiving information about the to-be-accessed DCN sent by the UE; and determining a core network device according to the information about the to-be-accessed DCN and preconfigured second DCN information, and initiating a service request to the core network device.

With reference to the second aspect, in a first possible implementation of the second aspect, the information about the to-be-accessed DCN includes a type of the to-be-accessed DCN; and the determining a core network device according to the information about the to-be-accessed DCN and preconfigured second DCN information includes:

determining, according to the type of the to-be-accessed DCN and the second DCN information, a DCN function entity group identifier corresponding to the type of the to-be-accessed DCN; and determining the core network device according to the DCN function entity group identifier and a second preset rule.

With reference to the first possible implementation of the second aspect, in a second possible implementation of the second aspect, the determining a core network device according to the information about the to-be-accessed DCN and preconfigured second DCN information further includes:

determining a preset default core network device as the core network device when no DCN function entity group identifier corresponding to the type of the to-be-accessed DCN is determined according to the type of the to-be-accessed DCN and the second DCN information; or sending a fourth message to the UE when no DCN function entity group identifier corresponding to the type of the to-be-accessed DCN is determined according to the type of the to-be-accessed DCN and the second DCN information, where the fourth message is used to terminate an access request.

With reference to the second aspect, in a third possible implementation of the second aspect, the information about the to-be-accessed DCN includes a DCN ID of the to-be-accessed DCN; and the determining a core network device according to the information about the to-be-accessed DCN and preconfigured DCN information includes:

determining, according to the DCN ID of the to-be-accessed DCN and the second DCN information, a DCN function entity group identifier corresponding to the to-be-accessed DCN; and determining the core network device according to the DCN function entity group identifier and a second preset rule.

With reference to the third possible implementation of the second aspect, in a fourth possible implementation of the second aspect, the determining a core network device according to the information about the to-be-accessed DCN and preconfigured DCN information further includes:

determining a preset default core network device as the core network device when no DCN function entity group identifier corresponding to the DCN ID of the to-be-accessed DCN is determined according to the DCN ID of the to-be-accessed DCN and the second DCN information; or sending a fourth message to the UE when no DCN function entity group identifier corresponding to the DCN ID of the to-be-accessed DCN is determined according to the DCN ID of the to-be-accessed DCN and the second DCN information, where the fourth message is used to terminate an access request.

With reference to any one of the second aspect, or the first to the fourth possible implementations of the second aspect, in a fifth possible implementation of the second aspect, before the sending first DCN information to UE, the method further includes:

obtaining the second DCN information from the core network device, where the second DCN information includes a type and a DCN function entity group identifier of the at least one DCN.

With reference to the fifth possible implementation of the second aspect, in a sixth possible implementation of the second aspect, the second DCN information further includes a DCN ID and a priority of the at least one DCN;

With reference to any one of the second aspect, the first or the second possible implementation of the second aspect, or the fifth or the sixth possible implementation of the second aspect, in a seventh possible implementation of the second aspect, before the sending first DCN information to UE, the method further includes:

receiving a first message sent by the UE, where the first message is used to indicate a DCN selection capability of the UE; and the sending first DCN information to UE includes:

sending a second message to the UE according to the first message, where the second message includes the first DCN information.

With reference to any one of the second aspect, or the third to the sixth possible implementations of the second aspect, in an eighth possible implementation of the second aspect, the sending first DCN information to UE includes:

sending a third message to the UE, where the third message includes the first DCN information.

According to a third aspect, an embodiment of the present invention provides a core network selection method, including:

sending second dedicated core network DCN information to an access network device, so that the access network device determines a core network device according to the second DCN information; and processing a service request initiated by the access network device.

With reference to the third aspect, in a first possible implementation of the third aspect, the second DCN information includes a type and a DCN function entity group identifier of at least one DCN.

With reference to the first possible implementation of the third aspect, in a second possible implementation of the third aspect, the second DCN information further includes a DCN ID and a priority of the at least one DCN.

According to a fourth aspect, an embodiment of the present invention provides user equipment UE, including:

a receiving module, configured to obtain first dedicated core network DCN information from an access network device, where the first DCN information includes information about at least one DCN that can be accessed by the access network device;

a selection module, configured to select a to-be-accessed DCN from the at least one DCN according to the first DCN information; and a sending module, configured to send information about the to-be-accessed DCN to the access network device, so that the access network device determines a core network device according to the information about the to-be-accessed DCN.

With reference to the fourth aspect, in a first possible implementation of the fourth aspect, the first DCN information includes a type of the at least one DCN;

the selection module is specifically configured to select, from the at least one DCN, a DCN whose type matches a service type of the user equipment UE, as the to-be-accessed DCN; and the sending module is specifically configured to send the type of the to-be-accessed DCN to the access network device, so that the access network device determines the core network device according to the type of the to-be-accessed DCN.

With reference to the fourth aspect, in a second possible implementation of the fourth aspect, the first DCN information includes a type, a DCN identity ID, and a priority of the at least one DCN;

the selection module is specifically configured to: select, from the at least one DCN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority; and the sending module is specifically configured to send a DCN ID of the to-be-accessed DCN to the access network device, so that the access network device determines the core network device according to the DCN ID of the to-be-accessed DCN.

With reference to any one of the fourth aspect, or the first or the second possible implementation of the fourth aspect, in a third possible implementation of the fourth aspect, the sending module is further configured to send a first message to the access network device, where the first message is used to indicate a DCN selection capability of the UE; and the receiving module is specifically configured to receive a second message that is sent by the access network device according to the first message, where the second message includes the first DCN information.

With reference to the fourth aspect, in a fourth possible implementation of the fourth aspect, the first DCN information includes a type of the at least one DCN;

the selection module is specifically configured to determine a to-be-accessed public land mobile network PLMN according to a first preset rule, and select, from at least one DCN supported by the to-be-accessed PLMN, a DCN whose type matches a service type of the UE, as the to-be-accessed DCN; and the sending module is specifically configured to send the type of the to-be-accessed DCN to the access network device, so that the access network device determines the core network device according to the type of the to-be-accessed DCN.

With reference to the fourth aspect, in a fifth possible implementation of the fourth aspect, the first DCN information includes a type of the at least one DCN;

the selection module is specifically configured to select, from the at least one DCN, a DCN whose type matches a service type of the UE, as the to-be-accessed DCN, and determine a to-be-accessed PLMN according to the type of the to-be-accessed DCN; and the sending module is specifically configured to send the type of the to-be-accessed DCN to the access network device, so that the access network device determines the core network device according to the type of the to-be-accessed DCN.

With reference to the fourth aspect, in a sixth possible implementation of the fourth aspect, the first DCN information includes a type, a DCN ID, and a priority of the at least one DCN;

the selection module is specifically configured to: determine a to-be-accessed PLMN according to a first preset rule; select, from at least one DCN supported by the to-be-accessed PLMN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority; and the sending module is specifically configured to send a DCN ID of the to-be-accessed DCN to the access network device, so that the access network device determines the core network device according to the DCN ID of the to-be-accessed DCN.

With reference to the fourth aspect, in a seventh possible implementation of the fourth aspect, the first DCN information includes a type, a DCN ID, and a priority of the at least one DCN;

the selection module is specifically configured to select, from the at least one DCN, a DCN whose type matches a service type of the UE, determine a to-be-accessed PLMN according to the type of the DCN whose type matches the service type of the UE, and select, according to the priority and from at least one DCN supported by the to-be-accessed PLMN, a DCN with the highest priority as the to-be-accessed DCN; and the sending module is specifically configured to send a DCN ID of the to-be-accessed DCN to the access network device, so that the access network device determines the core network device according to the DCN ID of the to-be-accessed DCN.

With reference to any one of the fourth aspect, or the fourth to the seventh possible implementations of the fourth aspect, in an eighth possible implementation of the fourth aspect, the receiving module is specifically configured to receive a third message sent by the access network device, where the third message includes the first DCN information.

With reference to any one of the fourth to the eighth possible implementations of the fourth aspect, in a ninth possible implementation of the fourth aspect, the sending module is further configured to request, to the access network device, to establish a wireless connection.

With reference to any one of the fourth aspect, or the first to the ninth possible implementations of the fourth aspect, in a tenth possible implementation of the fourth aspect, the selection module is further configured to: select a preset default DCN as the to-be-accessed DCN when the at least one DCN includes no DCN whose type matches the service type; or send an access termination request to the access network device when the at least one DCN includes no DCN whose type matches the service type; or obtain the first DCN information from another access network device when the at least one DCN includes no DCN whose type matches the service type.

According to a fifth aspect, an embodiment of the present invention provides an access network device, including:

a sending module, configured to send first dedicated core network DCN information to user equipment UE, so that the UE selects a to-be-accessed DCN according to the first DCN information, where the first DCN information includes information about at least one DCN that can be accessed by the access network device;

a receiving module, configured to receive information about the to-be-accessed DCN sent by the UE; and a determining module, configured to determine a core network device according to the information about the to-be-accessed DCN and preconfigured second DCN information, and initiate a service request to the core network device.

With reference to the fifth aspect, in a first possible implementation of the fifth aspect, the information about the to-be-accessed DCN includes a type of the to-be-accessed DCN; and the determining module is specifically configured to determine, according to the type of the to-be-accessed DCN and the second DCN information, a DCN function entity group identifier corresponding to the type of the to-be-accessed DCN, and determine the core network device according to the DCN function entity group identifier and a second preset rule.

With reference to the fifth aspect, in a second possible implementation of the fifth aspect, the determining module is further configured to: determine a preset default core network device as the core network device when no DCN function entity group identifier corresponding to the type of the to-be-accessed DCN is determined according to the type of the to-be-accessed DCN and the second DCN information; or send a fourth message to the UE when no DCN function entity group identifier corresponding to the type of the to-be-accessed DCN is determined according to the type of the to-be-accessed DCN and the second DCN information, where the fourth message is used to terminate an access request.

With reference to the fifth aspect, in a third possible implementation of the fifth aspect, the information about the to-be-accessed DCN includes a DCN ID of the to-be-accessed DCN; and the determining module is specifically configured to determine, according to the DCN ID of the to-be-accessed DCN and the second DCN information, a DCN function entity group identifier corresponding to the to-be-accessed DCN, and determine the core network device according to the DCN function entity group identifier and a second preset rule.

With reference to the third possible implementation of the fifth aspect, in a fourth possible implementation of the fifth aspect, the determining module is further configured to: determine a preset default core network device as the core network device when no DCN function entity group identifier corresponding to the DCN ID of the to-be-accessed DCN is determined according to the DCN ID of the to-be-accessed DCN and the second DCN information; or send a fourth message to the UE when no DCN function entity group identifier corresponding to the DCN ID of the to-be-accessed DCN is determined according to the DCN ID of the to-be-accessed DCN and the second DCN information, where the fourth message is used to terminate an access request.

With reference to any one of the fifth aspect, or the first to the fourth possible implementations of the fifth aspect, in a fifth possible implementation of the fifth aspect, the receiving module is further configured to obtain the second DCN information from the core network device, where the second DCN information includes a type and a DCN function entity group identifier of the at least one DCN.

With reference to the fifth possible implementation of the fifth aspect, in a sixth possible implementation of the fifth aspect, the second DCN information further includes a DCN ID and a priority of the at least one DCN.

With reference to any one of the fifth aspect, the first or the second possible implementation of the fifth aspect, or the fifth or the sixth possible implementation of the fifth aspect, in a seventh possible implementation of the fifth aspect, the receiving module is further configured to receive a first message sent by the UE, where the first message is used to indicate a DCN selection capability of the UE; and the sending module is specifically configured to send a second message to the UE according to the first message, where the second message includes the first DCN information.

With reference to any one of the fifth aspect, or the third to the sixth possible implementations of the fifth aspect, in an eighth possible implementation of the fifth aspect, the sending module is specifically configured to send a third message to the UE, where the third message includes the first DCN information.

According to a sixth aspect, an embodiment of the present invention provides a core network device, including:

a sending module, configured to send second dedicated core network DCN information to an access network device, so that the access network device determines the core network device according to the second DCN information; and a processing module, configured to process a service request initiated by the access network device.

With reference to the sixth aspect, in a first possible implementation of the sixth aspect, the second DCN information includes a type and a DCN function entity group identifier of at least one DCN.

With reference to the first possible implementation of the sixth aspect, in a second possible implementation of the sixth aspect, the second DCN information further includes a DCN ID and a priority of the at least one DCN.

According to a seventh aspect, an embodiment of the present invention provides user equipment UE, including:

a receiver, configured to obtain first dedicated core network DCN information from an access network device, where the first DCN information includes information about at least one DCN that can be accessed by the access network device;

a processor, configured to select a to-be-accessed DCN from the at least one DCN according to the first DCN information; and a transmitter, configured to send information about the to-be-accessed DCN to the access network device, so that the access network device determines a core network device according to the information about the to-be-accessed DCN.

With reference to the seventh aspect, in a first possible implementation of the seventh aspect, the first DCN information includes a type of the at least one DCN;

the processor is specifically configured to select, from the at least one DCN, a DCN whose type matches a service type of the user equipment UE, as the to-be-accessed DCN; and the transmitter is specifically configured to send the type of the to-be-accessed DCN to the access network device, so that the access network device determines the core network device according to the type of the to-be-accessed DCN.

With reference to the seventh aspect, in a second possible implementation of the seventh aspect, the first DCN information includes a type, a DCN identity ID, and a priority of the at least one DCN;

the processor is specifically configured to: select, from the at least one DCN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority; and the transmitter is specifically configured to send a DCN ID of the to-be-accessed DCN to the access network device, so that the access network device determines the core network device according to the DCN ID of the to-be-accessed DCN.

With reference to any one of the seventh aspect, or the first or the second possible implementation of the seventh aspect, in a third possible implementation of the seventh aspect, the transmitter is further configured to send a first message to the access network device, where the first message is used to indicate a DCN selection capability of the UE; and the receiver is specifically configured to receive a second message that is sent by the access network device according to the first message, where the second message includes the first DCN information.

With reference to the seventh aspect, in a fourth possible implementation of the seventh aspect, the first DCN information includes a type of the at least one DCN;

the processor is specifically configured to determine a to-be-accessed public land mobile network PLMN according to a first preset rule, and select, from at least one DCN supported by the to-be-accessed PLMN, a DCN whose type matches a service type of the UE, as the to-be-accessed DCN; and the transmitter is specifically configured to send the type of the to-be-accessed DCN to the access network device, so that the access network device determines the core network device according to the type of the to-be-accessed DCN.

With reference to the seventh aspect, in a fifth possible implementation of the seventh aspect, the first DCN information includes a type of the at least one DCN;

the processor is specifically configured to select, from the at least one DCN, a DCN whose type matches a service type of the UE, as the to-be-accessed DCN, and determine a to-be-accessed PLMN according to the type of the to-be-accessed DCN; and the transmitter is specifically configured to send the type of the to-be-accessed DCN to the access network device, so that the access network device determines the core network device according to the type of the to-be-accessed DCN.

With reference to the seventh aspect, in a sixth possible implementation of the seventh aspect, the first DCN information includes a type, a DCN ID, and a priority of the at least one DCN;

the processor is specifically configured to: determine a to-be-accessed PLMN according to a first preset rule; select, from at least one DCN supported by the to-be-accessed PLMN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority; and the transmitter is specifically configured to send a DCN ID of the to-be-accessed DCN to the access network device, so that the access network device determines the core network device according to the DCN ID of the to-be-accessed DCN.

With reference to the seventh aspect, in a seventh possible implementation of the seventh aspect, the first DCN information includes a type, a DCN ID, and a priority of the at least one DCN;

the processor is specifically configured to select, from the at least one DCN, a DCN whose type matches a service type of the UE, determine a to-be-accessed PLMN according to the type of the DCN whose type matches the service type of the UE, and select, according to the priority and from at least one DCN supported by the to-be-accessed PLMN, a DCN with the highest priority as the to-be-accessed DCN; and the transmitter is specifically configured to send a DCN ID of the to-be-accessed DCN to the access network device, so that the access network device determines the core network device according to the DCN ID of the to-be-accessed DCN.

With reference to any one of the seventh aspect, or the fourth to the seventh possible implementations of the seventh aspect, in an eighth possible implementation of the seventh aspect, the receiver is specifically configured to receive a third message sent by the access network device, where the third message includes the first DCN information.

With reference to any one of the fourth to the eighth possible implementations of the seventh aspect, in a ninth possible implementation of the seventh aspect, the transmitter is further configured to request, to the access network device, to establish a wireless connection.

With reference to any one of the seventh aspect, or the first to the ninth possible implementations of the seventh aspect, in a tenth possible implementation of the seventh aspect, the processor is further configured to: select a preset default DCN as the to-be-accessed DCN when the at least one DCN includes no DCN whose type matches the service type; or send an access termination request to the access network device when the at least one DCN includes no DCN whose type matches the service type; or obtain the first DCN information from another access network device when the at least one DCN includes no DCN whose type matches the service type.

According to an eighth aspect, an embodiment of the present invention provides an access network device, including:

a transmitter, configured to send first dedicated core network DCN information to user equipment UE, so that the UE selects a to-be-accessed DCN according to the first DCN information, where the first DCN information includes information about at least one DCN that can be accessed by the access network device;

a receiver, configured to receive information about the to-be-accessed DCN sent by the UE; and a processor, configured to determine a core network device according to the information about the to-be-accessed DCN and preconfigured second DCN information, and initiate a service request to the core network device.

With reference to the eighth aspect, in a first possible implementation of the eighth aspect, the information about the to-be-accessed DCN includes a type of the to-be-accessed DCN;

the processor is specifically configured to determine, according to the type of the to-be-accessed DCN and the second DCN information, a DCN function entity group identifier corresponding to the type of the to-be-accessed DCN, and determine the core network device according to the DCN function entity group identifier and a second preset rule.

With reference to the first possible implementation of the eighth aspect, in a second possible implementation of the eighth aspect, the processor is further configured to: determine a preset default core network device as the core network device when no DCN function entity group identifier corresponding to the type of the to-be-accessed DCN is determined according to the type of the to-be-accessed DCN and the second DCN information; or send a fourth message to the UE when no DCN function entity group identifier corresponding to the type of the to-be-accessed DCN is determined according to the type of the to-be-accessed DCN and the second DCN information, where the fourth message is used to terminate an access request.

With reference to the eighth aspect, in a third possible implementation of the eighth aspect, the information about the to-be-accessed DCN includes a DCN ID of the to-be-accessed DCN; and the processor is specifically configured to determine, according to the DCN ID of the to-be-accessed DCN and the second DCN information, a DCN function entity group identifier corresponding to the to-be-accessed DCN, and determine the core network device according to the DCN function entity group identifier and a second preset rule.

With reference to the third possible implementation of the eighth aspect, in a fourth possible implementation of the eighth aspect, the processor is further configured to: determine a preset default core network device as the core network device when no DCN function entity group identifier corresponding to the DCN ID of the to-be-accessed DCN is determined according to the DCN ID of the to-be-accessed DCN and the second DCN information; or send a fourth message to the UE when no DCN function entity group identifier corresponding to the DCN ID of the to-be-accessed DCN is determined according to the DCN ID of the to-be-accessed DCN and the second DCN information, where the fourth message is used to terminate an access request.

With reference to any one of the eighth aspect, or the first to the fourth possible implementations of the eighth aspect, in a fifth possible implementation of the eighth aspect, the receiver is further configured to obtain the second DCN information from the core network device, where the second DCN information includes a type and a DCN function entity group identifier of the at least one DCN.

With reference to the fifth possible implementation of the eighth aspect, in a sixth possible implementation of the eighth aspect, the second DCN information further includes a DCN ID and a priority of the at least one DCN.

With reference to any one of the eighth aspect, the first or the second possible implementation of the eighth aspect, or the fifth or the sixth possible implementation of the eighth aspect, in a seventh possible implementation of the eighth aspect, the receiver is further configured to receive a first message sent by the UE, where the first message is used to indicate a DCN selection capability of the UE; and the transmitter is specifically configured to send a second message to the UE according to the first message, where the second message includes the first DCN information.

With reference to any one of the eighth aspect, or the third to the sixth possible implementations of the eighth aspect, in an eighth possible implementation of the eighth aspect, the transmitter is specifically configured to send a third message to the UE, where the third message includes the first DCN information.

According to a ninth aspect, an embodiment of the present invention provides a core network device, including:

a transmitter, configured to send second dedicated core network DCN information to an access network device, so that the access network device determines the core network device according to the second DCN information; and a processor, configured to process a service request initiated by the access network device.

With reference to the ninth aspect, in a first possible implementation of the ninth aspect, the second DCN information includes a type and a DCN function entity group identifier of at least one DCN.

With reference to the first possible implementation of the ninth aspect, in a second possible implementation of the ninth aspect, the second DCN information further includes a DCN ID and a priority of the at least one DCN.

According to a tenth aspect, an embodiment of the present invention provides a communications system, including user equipment UE, an access network device, and a core network device, where the UE is the UE according to any one of the fourth aspect, or the first to the tenth possible implementations of the fourth aspect, the access network device is the device according to any one of the fifth aspect, or the first to the eighth possible implementations of the fifth aspect, and the core network device is the device according to any one of the sixth aspect, or the first or the second possible implementation of the sixth aspect.

According to an eleventh aspect, an embodiment of the present invention provides a communications system, including user equipment UE, an access network device, and a core network device, where the UE is the UE according to any one of the seventh aspect, or the first to the tenth possible implementations of the seventh aspect, the access network device is the device according to any one of the eighth aspect, or the first to the eighth possible implementations of the eighth aspect, and the core network device is the device according to any one of the ninth aspect, or the first or the second possible implementation of the ninth aspect.

According to the core network selection method, the apparatus, and the system provided in the embodiments of the present invention, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
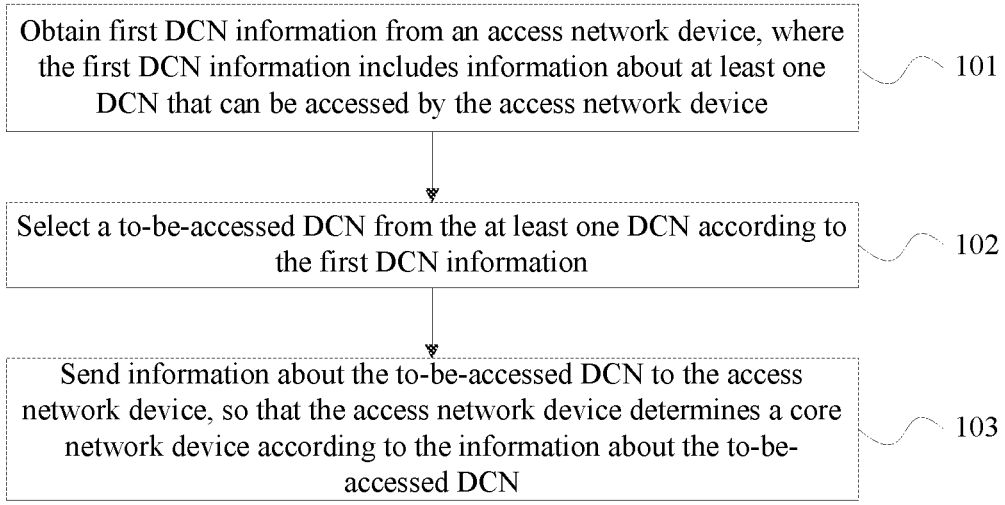
FIG. 1 is a flowchart of an embodiment of a core network selection method according to the present invention.

FIG. 1 is a flowchart of an embodiment of a core network selection method according to the present invention. As shown in FIG. 1, the method in this embodiment may include the following steps.

Step 101: Obtain first DCN information from an access network device, where the first DCN information includes information about at least one DCN that can be accessed by the access network device.

The core network selection method is applicable to a communications system in which network slicing is performed on a core network. A DCN corresponding to a single network slice may be defined as a set of function entities supporting a communications service requirement in a specific scenario, for example, a mobility management entity (Mobility Management Entity, MME for short) on a 4G network and a serving GPRS support node (Serving GPRS Support Node, SGSN for short) on a 3G network. This embodiment may be executed by user equipment (User Equipment, UE for short). The UE obtains the first DCN information from the access network device. The access network device may be an evolved NodeB (evolved Node B, eNB for short), a radio access network node (Radio Access Network Node, RAN Node for short), or the like. Based on deployment of the communications system and a function of each DCN, the access network device may access one or more DCNs. During preconfiguration of the access network device and the DCN, the access network device may obtain information about the DCN. Then, the access network device sends the information about the DCN to the UE.

Step 102: Select a to-be-accessed DCN from the at least one DCN according to the first DCN information.

The UE may know, according to the first DCN information obtained from the access network device, which DCN is a candidate DCN. Then, the UE may select one of the candidate DCNs as the to-be-accessed DCN. A method for the UE to select the to-be-accessed DCN is, for example, as follows: A to-be-accessed DCN that matches a service type may be selected from the candidate DCNs according to the service type, including a device type of the UE, a use type of the UE, and the like. For example, if a use type of the UE is a common network service, a to-be-accessed DCN selected by the UE needs to be responsible mainly for a service related to a mobile broadband network. Alternatively, the UE may select, from the candidate DCNs, a DCN with the highest priority as the to-be-accessed DCN, or randomly select one of the candidate DCNs as the to-be-accessed DCN.

Step 103: Send information about the to-be-accessed DCN to the access network device, so that the access network device determines a core network device according to the information about the to-be-accessed DCN.

After selecting the to-be-accessed DCN, the UE sends the information about the to-be-accessed DCN to the access network device. Then, the access network device can determine the core network device combining with a DCN function entity group identifier of the to-be-accessed DCN.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 2:
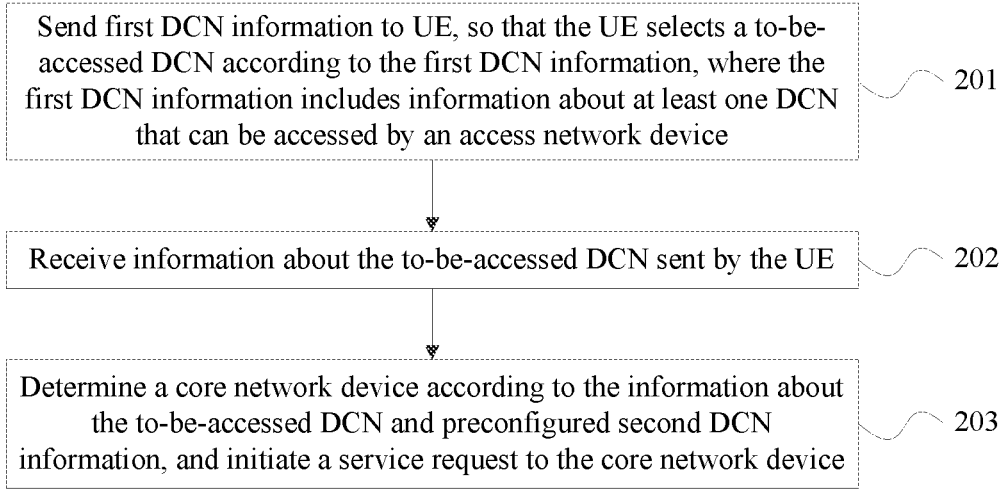
FIG. 2 is a flowchart of another embodiment of a core network selection method according to the present invention.

FIG. 2 is a flowchart of another embodiment of a core network selection method according to the present invention. As shown in FIG. 2, the method in this embodiment may include the following steps.

Step 201: Send first DCN information to UE, so that the UE selects a to-be-accessed DCN according to the first DCN information, where the first DCN information includes information about at least one DCN that can be accessed by an access network device.

This embodiment corresponds to the method embodiment shown in FIG. 1, and is executed by the access network device. The access network device sends, to the UE, the first DCN information that includes the information about the at least one DCN that can be accessed by the access network device, so that the UE performs step 102 and selects the to-be-accessed DCN.

Step 202: Receive information about the to-be-accessed DCN sent by the UE.

Step 203: Determine a core network device according to the information about the to-be-accessed DCN and preconfigured second DCN information, and initiate a service request to the core network device.

After obtaining the information about the to-be-accessed DCN, the access network device selects the final core network device according to the information about the to-be-accessed DCN and the preconfigured second DCN information. The second DCN information is preconfigured by the access network device and the at least one DCN that can be accessed by the access network device, and includes the information about the at least one DCN, for example, a type, a DCN identity (identity, ID for short), a priority, and a DCN function entity group identifier. The access network device selects, from the second DCN information, a core network device that matches the information about the to-be-accessed DCN, as the core network device. Then, the access network device can send the service request of the UE to the core network device for processing.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 3:
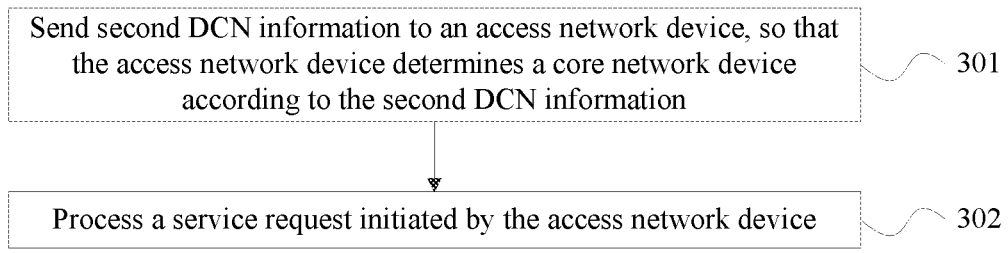
FIG. 3 is a flowchart of still another embodiment of a core network selection method according to the present invention.

FIG. 3 is a flowchart of still another embodiment of a core network selection method according to the present invention. As shown in FIG. 3, the method in this embodiment may include the following steps.

Step 301: Send second DCN information to an access network device, so that the access network device determines a core network device according to the second DCN information.

This embodiment corresponds to the method embodiment shown in FIG. 2, and is executed by the core network device. Before the access network device determines the core network device, the core network device needs to perform DCN information configuration interaction with the access network device. The access network device communicates with the core network device in an accessible DCN, and the core network device sends DCN information of the core network device to the access network device. Therefore, a list of information about one or more DCNs can be formed on the access network device.

Step 302: Process a service request initiated by the access network device.

After establishing a connection to the access network device, the core network device can process the service request sent by the access network device.

According to this embodiment, a core network device and an access network device preconfigure DCN information, so as to implement accurate selection of the core network device by the access network device, improve accuracy of DCN selection by the access network device, avoid a communication signaling increase and a processing delay in a DCN reselection process, and improve communication efficiency.

In the following content, several specific embodiments are used to describe in detail the technical solutions in the method embodiments shown in FIG. 1 to FIG. 3.

Figure 4:
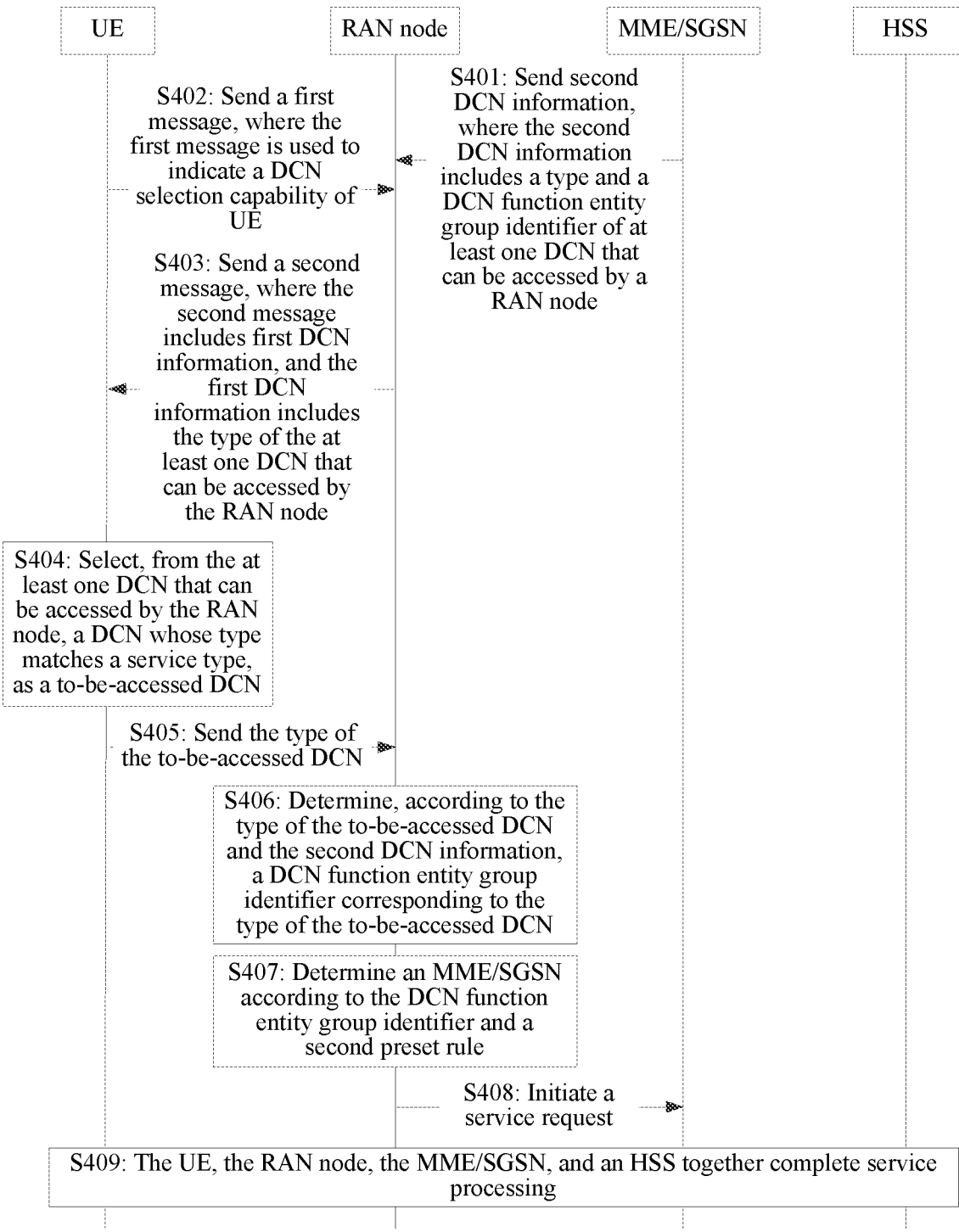
FIG. 4 is a flowchart of yet another embodiment of a core network selection method according to the present invention.

FIG. 4 is a flowchart of yet another embodiment of a core network selection method according to the present invention. As shown in FIG. 4, the method in this embodiment is applicable to a communications system including UE, a RAN node, an MME/SGSN, and a home subscriber server (Home Subscriber Server, HHS for short). The MME/SGSN is the foregoing core network device, and the HSS is a core network device that provides a core network user plane function. It should be noted that the method in this embodiment may be applicable to any communications system that includes UE, an access network device, and a core network device. For ease of method embodiment description, the foregoing communications system is merely an example. The method in this embodiment may include the following steps.

S401: The MME/SGSN sends second DCN information to the RAN node, where the second DCN information includes a type and a DCN function entity group identifier of at least one DCN that can be accessed by the RAN node.

In this embodiment, the MME/SGSN configures the second DCN information to the RAN node. The second DCN information may include a list of information about the one or more DCNs that can be accessed by the RAN node, and each list item includes the following attribute information: a DCN type (DCN Type) and a DCN function entity group identifier (for example, an MME group identifier (Group ID), an SGSN group ID, or a default NRI). The DCN type indicates a specific communications service or communication scenario supported by the DCN. For example, the DCN type is a Cellular Internet of Things (CIoT), an ultra-reliable communication (Ultra-Reliable Communication, URC for short) network, a mobile broadband network (MBB), or the like.

S402: The UE sends a first message to the RAN node, where the first message is used to indicate a DCN selection capability of the UE.

The first message may be a radio resource control (Radio Resource Control, RRC for short) connection request message (RRC Connection Request). When sending the RRC connection request to the RAN node, the UE may add, to the RRC connection request, indication information that indicates the DCN selection capability of the UE, so as to indicate that the UE is capable of selecting a DCN.

S403: The RAN node sends a second message to the UE, where the second message includes first DCN information, and the first DCN information includes the type of the at least one DCN that can be accessed by the RAN node.

The second message may be an RRC connection setup message (RRC Connection Setup). The RAN node adds the first DCN information to the RRC connection setup that is sent as a reply. The first DCN information includes the type of the at least one DCN that can be accessed by the RAN node.

S404: The UE selects, from the at least one DCN that can be accessed by the RAN node, a DCN whose type matches a service type, as a to-be-accessed DCN.

The UE selects, according to the service type including a use type of the UE and a device type of the UE, a DCN type that matches the service type. For example, if the UE is used as a common meter or a common sensor, a DCN type that matches the service type is CIoT; if the UE is used as a transport tool or for telemedicine, a DCN type that matches the service type is URC; if the UE is used for a common network service of entertainment or of monitoring, a DCN type that matches the service type is MBB. The UE may determine the to-be-accessed DCN according to the DCN type that matches the service type.

In addition, when the UE does not find any DCN whose type matches the service type, the UE may select a preset default DCN as the to-be-accessed DCN. The default DCN may be preconfigured by the MME/SGSN for the RAN node, and then the RAN node sends information about the default DCN to the UE by using an RRC connection setup. Alternatively, the UE may send an access termination request to the RAN node, to terminate this connection request process. Alternatively, the UE may perform a process such as PLMN reselection and/or cell reselection, and obtain the first DCN information from another RAN node.

S405: The UE sends the type of the to-be-accessed DCN to the RAN node.

The UE may encapsulate the type of the to-be-accessed DCN into an RRC connection setup complete message (RRC Connection Setup Complete), to send the type of the to-be-accessed DCN to the RAN node. In addition, the RRC connection setup complete may further carry a non-access stratum (Non-Access Stratum, NAS for short) message, for example, an attach (Attach) request message, a tracking area update (Tracking Area Update, TAU for short) request message, a route area update (Route Area Update, RAU for short) request message, or a service request (Service Request) message.

S406: The RAN node determines, according to the type of the to-be-accessed DCN and the second DCN information, a DCN function entity group identifier corresponding to the type of the to-be-accessed DCN.

The RAN node can determine, according to the DCN type and the second DCN information, the DCN function entity group identifier corresponding to the DCN type. If the second DCN information includes no DCN function entity group identifier corresponding to the DCN type, the RAN node may select a default DCN or send an RRC connection reject message (RRC Connection Reject) to the UE, where the RRC connection reject carries a reject cause "no DCN available (No DCN available)", and the RAN node does not perform any subsequent step.

S407: The RAN node determines the MME/SGSN according to the DCN function entity group identifier and a second preset rule.

The RAN node further selects one function entity, such as an MME in 4G or an SGSN in 3G, in the DCN corresponding to the DCN function entity group identifier, as the core network device. The second preset rule may include, for example, selecting, according to a load status of each function entity in a DCN function entity group corresponding to the DCN function entity group identifier and according to a load balancing (Load Balancing) principle, a function entity with relatively low load as the core network device used for processing a UE service request.

S408: The RAN node initiates a service request to the MME/SGSN.

S409: The UE, the RAN node, the MME/SGSN, and the HSS together complete service processing.

The RAN node forwards the NAS message in the RRC connection setup complete message to the determined MME/SGSN. The MME/SGSN processes the NAS message, and sends a create session message to the HSS in the to-be-accessed DCN. The MME/SGSN, the HSS, the RAN node, and the UE together complete a NAS process corresponding to the NAS message.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 5A:
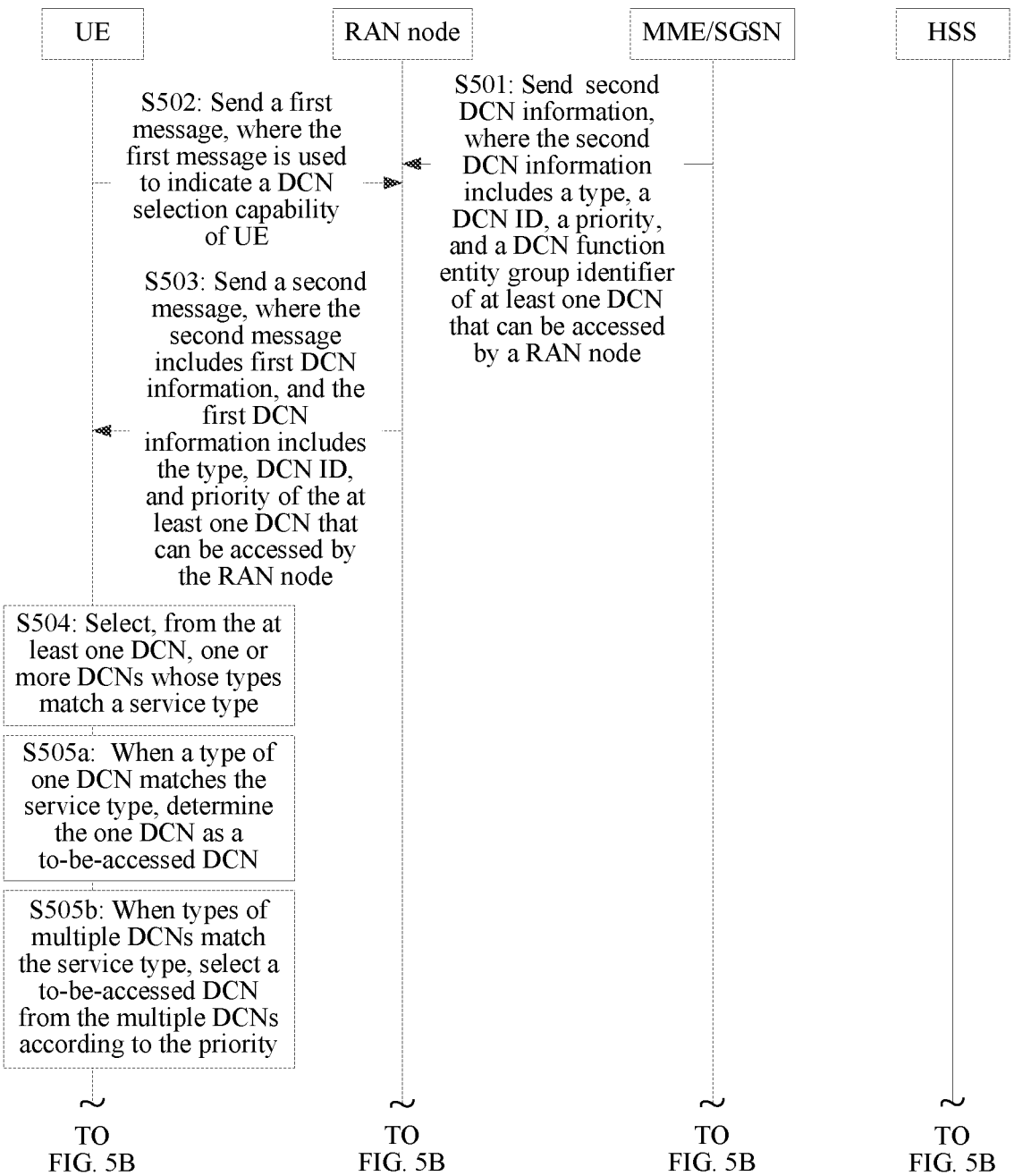
FIG. 5A and FIG. 5B are a flowchart of a fifth embodiment of a core network selection method according to the present invention.
Figure 5B:
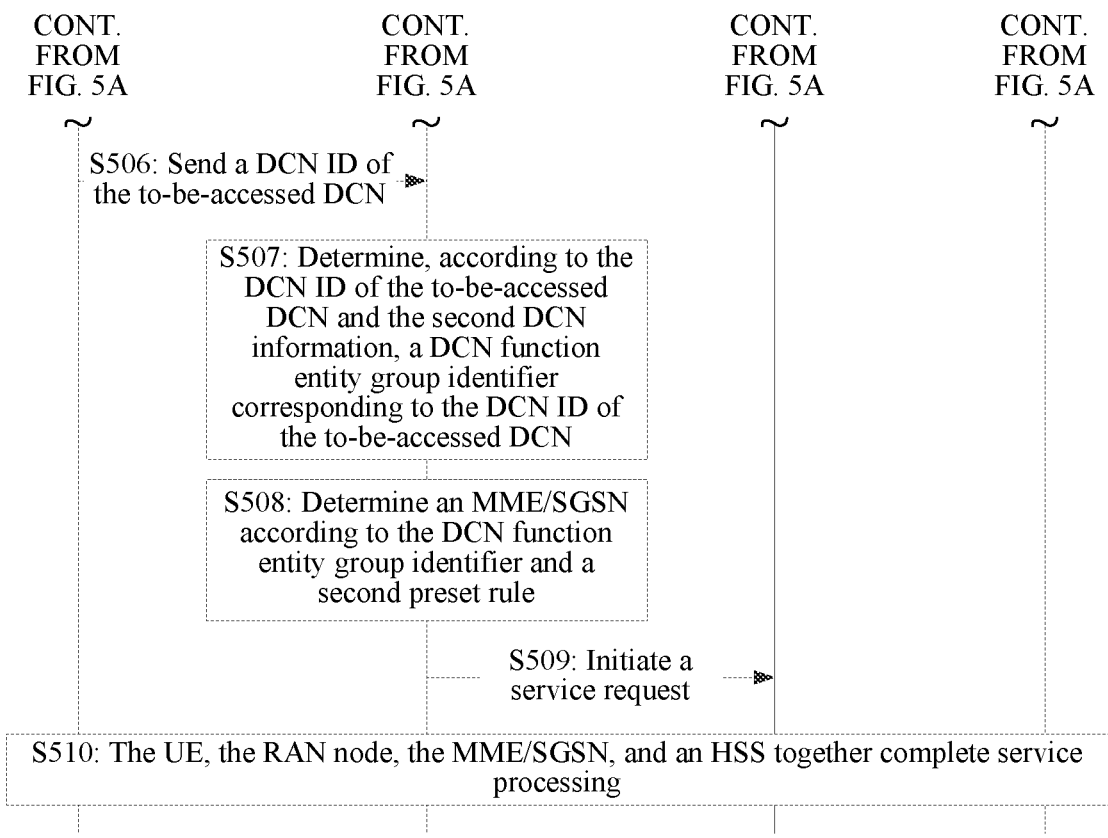

FIG. 5A and FIG. 5B are a flowchart of a fifth embodiment of a core network selection method according to the present invention. As shown in FIG. 5A and FIG. 5B, the method in this embodiment is applicable to a communications system including UE, a RAN node, an MME/SGSN, and an HHS. The MME/SGSN is the foregoing core network device, and the HSS is a core network device that provides a core network user plane function. It should be noted that the method in this embodiment may be applicable to any communications system that includes UE, an access network device, and a core network device. For ease of method embodiment description, the foregoing communications system is merely an example. The method in this embodiment may include the following steps.

S501: The MME/SGSN sends second DCN information to the RAN node, where the second DCN information includes a type, a DCN ID, a priority, and a DCN function entity group identifier of at least one DCN that can be accessed by the RAN node.

In this embodiment, the MME/SGSN configures the second DCN information to the RAN node. The second DCN information may include a list of information about the one or more DCNs that can be accessed by the RAN node, and each list item includes the following attribute information: a DCN type (DCN Type) and a DCN function entity group identifier (for example, an MME group identifier (Group ID), an SGSN group ID, or a default NRI). The DCN type indicates a specific communications service or communication scenario supported by the DCN. For example, the DCN type is a Cellular Internet of Things (CIoT), an ultra-reliable communication (Ultra-Reliable Communication, URC for short) network, a mobile broadband network (MBB), or the like. A DCN ID may be defined as a unique identity, for example, 1 or 2, of a DCN within one public land mobile network (Public Land Mobile Network, PLMN for short). Alternatively, a DCN ID may be defined as a globally unique ID of a DCN. For example, DCN ID=PLMN ID+DCN local ID=MCC+MNC+DCN local ID, where DCN local ID is a unique identity of a DCN within one PLMN. For example, if MCC=460, MNC=10, and DCN local ID=1, then DCN ID=460101. DCN type-DCN ID mapping may be one-to-one mapping or one-to-many mapping. When one DCN type corresponds to multiple DCN IDs, each DCN ID may further correspond to one priority level. Table 1 is a schematic table of the second DCN information.

TABLE 1

| DCN ID | DCN type | Priority | DCN function entity group identifier |
| --- | --- | --- | --- |
| 1 | CIoT | 1 | MMEGI: 1100 . . . 00 |
| 2 | CIoT | 2 | MMEGI: 1100 . . . 01 |
| 3 | MBB | 1 | MMEGI: 1011 . . . 01 |

S502: The UE sends a first message to the RAN node, where the first message is used to indicate a DCN selection capability of the UE.

A principle of S502 is similar to that of S402, and details are not described herein again.

S503: The RAN node sends a second message to the UE, where the second message includes first DCN information, and the first DCN information includes the type, DCN ID, and priority of the at least one DCN that can be accessed by the RAN node.

A principle of S503 is similar to that of S403. The only difference lies in that, in this embodiment, the first DCN information further includes the DCN ID and priority of the at least one DCN that can be accessed by the RAN node. Details are not described herein again.

S504: The UE selects, from the at least one DCN, one or more DCNs whose types match a service type.

The UE selects, according to the service type including a use type of the UE and a device type of the UE, a DCN type that matches the service type. For example, if the UE is used as a common meter or a common sensor, a DCN type that matches the service type is CIoT; if the UE is used as a transport tool or for telemedicine, a DCN type that matches the service type is URC; if the UE is used for a common network service of entertainment or of monitoring, a DCN type that matches the service type is MBB. The UE may determine one or more DCNs according to the DCN type that matches the service type. When one DCN is determined, it indicates that DCN type-DCN ID mapping is one-to-one mapping. When multiple DCNs are determined, it indicates that DCN type-DCN ID mapping is one-to-many mapping.

S505a: When a type of one DCN matches the service type, the UE determines the one DCN as a to-be-accessed DCN.

If there is only one DCN whose type matches the service type, the UE directly obtains a DCN ID of the DCN.

S505b: When types of multiple DCNs match the service type, the UE selects a to-be-accessed DCN from the multiple DCNs according to the priority.

When there are multiple DCNs whose types match the service type, a priority may be set for a DCN ID of each DCN. After determining the DCN types, the UE may further select a DCN ID according to a priority. For example, DCN type=CIoT, and correspondingly, DCN ID=460101 or 460102. A DCN whose DCN ID=460101 is a commercial network, and has a priority of 1 (high-priority). A DCN whose DCN ID=460102 is an experimental network, and has a priority of 2 (low-priority). The UE may continue to select, according to the service type, a DCN with a matching priority level as the to-be-accessed DCN. A priority of a DCN may be changed. For example, when the DCN whose DCN ID=460102 is tested and is upgraded to a commercial network, and has better performance than the DCN whose DCN ID=460101 does, the priority for DCN ID=460102 may be changed to 1, and the priority for DCN ID=460101 may be changed to 2.

S505a and S505b are alternative steps. The step to be performed is determined according to a quantity of DCNs whose types match the service type.

In addition, when the UE does not find any DCN whose type matches the service type, the UE may select a preset default DCN as the to-be-accessed DCN. The default DCN may be preconfigured by the MME/SGSN for the RAN node, and then the RAN node sends information about the default DCN to the UE by using an RRC connection setup. Alternatively, the UE may send an access termination request to the RAN node, to terminate this connection request process. Alternatively, the UE may perform a process such as PLMN reselection and/or cell reselection, and obtain the first DCN information from another RAN node.

S506: The UE sends the DCN ID of the to-be-accessed DCN to the RAN node.

A principle of S506 is similar to that of S405. The only difference lies in that, in this embodiment, the UE encapsulates the DCN ID of the to-be-accessed DCN into the RRC connection setup complete, to send the DCN ID of the to-be-accessed DCN to the RAN node. Details are not described herein again.

S507: The RAN node determines, according to the DCN ID of the to-be-accessed DCN and the second DCN information, a DCN function entity group identifier corresponding to the DCN ID of the to-be-accessed DCN.

A principle of S507 is similar to that of S406. The only difference lies in that, in this embodiment, the RAN node determines the DCN function entity group identifier according to the DCN ID of the to-be-accessed DCN. Details are not described herein again.

S508: The RAN node determines the MME/SGSN according to the DCN function entity group identifier and a second preset rule.

A principle of S508 is similar to that of S407, and details are not described herein again.

S509: The RAN node initiates a service request to the MME/SGSN.

S510: The UE, the RAN node, the MME/SGSN, and the HSS together complete service processing.

Principles of S509 and S510 are similar to those of S408 and S409, and details are not described herein again.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 6A:
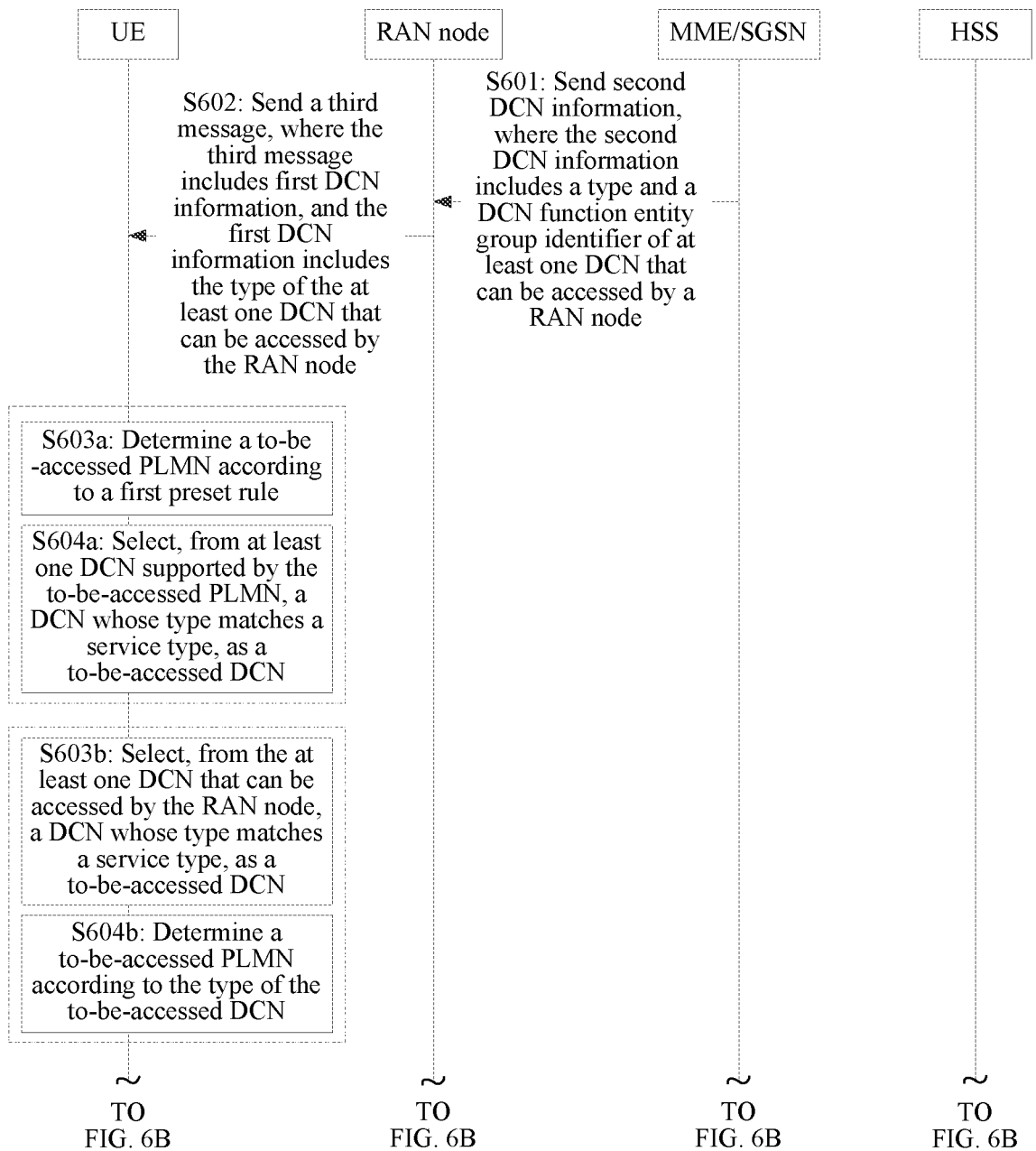
FIG. 6A and FIG. 6B are a flowchart of a sixth embodiment of a core network selection method according to the present invention.
Figure 6B:
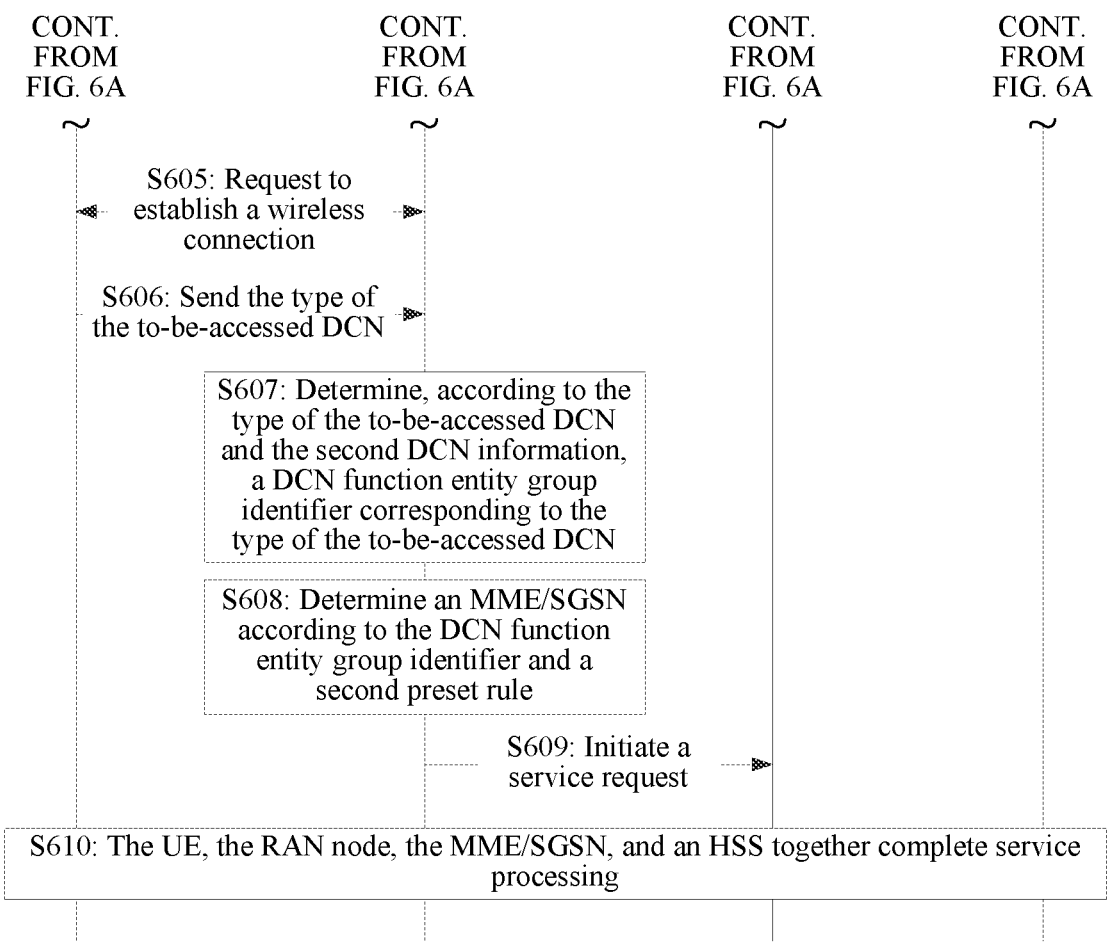

FIG. 6A and FIG. 6B are a flowchart of a sixth embodiment of a core network selection method according to the present invention. As shown in FIG. 6A and FIG. 6B, the method in this embodiment is applicable to a communications system including UE, a RAN node, an MME/SGSN, and an HHS. The MME/SGSN is the foregoing core network device, and the HSS is a core network device that provides a core network user plane function. It should be noted that the method in this embodiment may be applicable to any communications system that includes UE, an access network device, and a core network device. For ease of method embodiment description, the foregoing communications system is merely an example. The method in this embodiment may include the following steps.

S601: The MME/SGSN sends second DCN information to the RAN node, where the second DCN information includes a type and a DCN function entity group identifier of at least one DCN that can be accessed by the RAN node.

A principle of S601 is similar to that of S401, and details are not described herein again.

S602: The RAN node sends a third message to the UE, where the third message includes first DCN information, and the first DCN information includes the type of the at least one DCN that can be accessed by the RAN node.

The third message may be a broadcast message that is sent by the RAN node and that includes the type of the at least one DCN that can be accessed by the RAN node.

The UE may select, according to the broadcast message, a PLMN and a to-be-accessed DCN in either of the two following manners:

S603a: The UE determines the to-be-accessed PLMN according to a first preset rule.

The first preset rule may include, for example, the following: The UE preferentially selects a registered PLMN (Registered PLMN) or a PLMN that is equivalent to a registered PLMN, less preferentially selects a PLMN at a home location of the UE or a PLMN that is equivalent to a PLMN at a home location of the UE, and least preferentially selects a preferred PLMN configured by a user or an operator.

S604a: The UE selects, from at least one DCN supported by the to-be-accessed PLMN, a DCN whose type matches a service type, as the to-be-accessed DCN.

The UE first performs a PLMN selection process, to select one PLMN ID from multiple PLMN IDs. Then, the UE selects, from the at least one DCN supported by the PLMN, the DCN whose DCN type matches the service type, as the to-be-accessed DCN. A principle of a process in which the UE selects the to-be-accessed DCN is similar to that of S404, and details are not described herein again. In this case, the DCN type may be indicated as a parameter included in information about each PLMN in the broadcast message. That is, the information about each PLMN may include {PLMN ID, {DCN type1, DCN type2}, ... }.

S603b: The UE selects, from the at least one DCN that can be accessed by the RAN node, a DCN whose type matches a service type, as the to-be-accessed DCN.

S604b: The UE determines the to-be-accessed PLMN according to the type of the to-be-accessed DCN.

The UE first selects, from the at least one DCN that can be accessed by the RAN node, the DCN whose DCN type matches the service type. A principle of a process in which the UE selects the DCN whose type matches the service type is similar to that of S404, and details are not described herein again. Then, the UE selects one PLMN from PLMNs that support the DCN type of the selected DCN, as the to-be-accessed PLMN. In this case, information about each DCN in the broadcast message may include {DCN type, {PLMN ID1, PLMN ID2}, ... }. For example, the UE first selects, according to a use type (for example, the UE is used as a common meter), a DCN whose DCN Type=CIoT, and then selects a PLMN ID2 from a PLMN ID1 and the PLMN ID2 that support DCN Type=CIoT.

S603a and S604a, and S603b and S604b are alternative steps. The UE can select the PLMN and the to-be-accessed DCN by using either of the two methods.

In addition, when the UE does not find any DCN whose type matches the service type, the UE may select a preset default DCN as the to-be-accessed DCN. The default DCN may be preconfigured by the MME/SGSN for the RAN node, and then the RAN node sends information about the default DCN to the UE by using an RRC connection setup. Alternatively, the UE may send an access termination request to the RAN node, to terminate this connection request process. Alternatively, the UE may perform a process such as PLMN reselection and/or cell reselection, and obtain the first DCN information from another RAN node.

S605: The UE requests, to the RAN node, to establish a wireless connection.

That the UE requests, to the RAN node, to establish a wireless connection is performing a cell selection process. The UE selects a cell of the PLMN selected in the foregoing step, and performs a random access process to establish a connection to the RAN node. The UE may send an RRC connection request to the RAN node. The RAN node replies with an RRC connection setup.

S606: The UE sends the type of the to-be-accessed DCN to the RAN node.

A principle of S606 is similar to that of S405, and details are not described herein again.

S607: The RAN node determines, according to the type of the to-be-accessed DCN and the second DCN information, a DCN function entity group identifier corresponding to the type of the to-be-accessed DCN.

A principle of S607 is similar to that of S406, and details are not described herein again.

S608: The RAN node determines the MME/SGSN according to the DCN function entity group identifier and a second preset rule.

A principle of S608 is similar to that of S407, and details are not described herein again.

S609: The RAN node initiates a service request to the MME/SGSN.

S610: The UE, the RAN node, the MME/SGSN, and the HSS together complete service processing.

Principles of S609 and S610 are similar to those of S408 and S409, and details are not described herein again.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 7A:
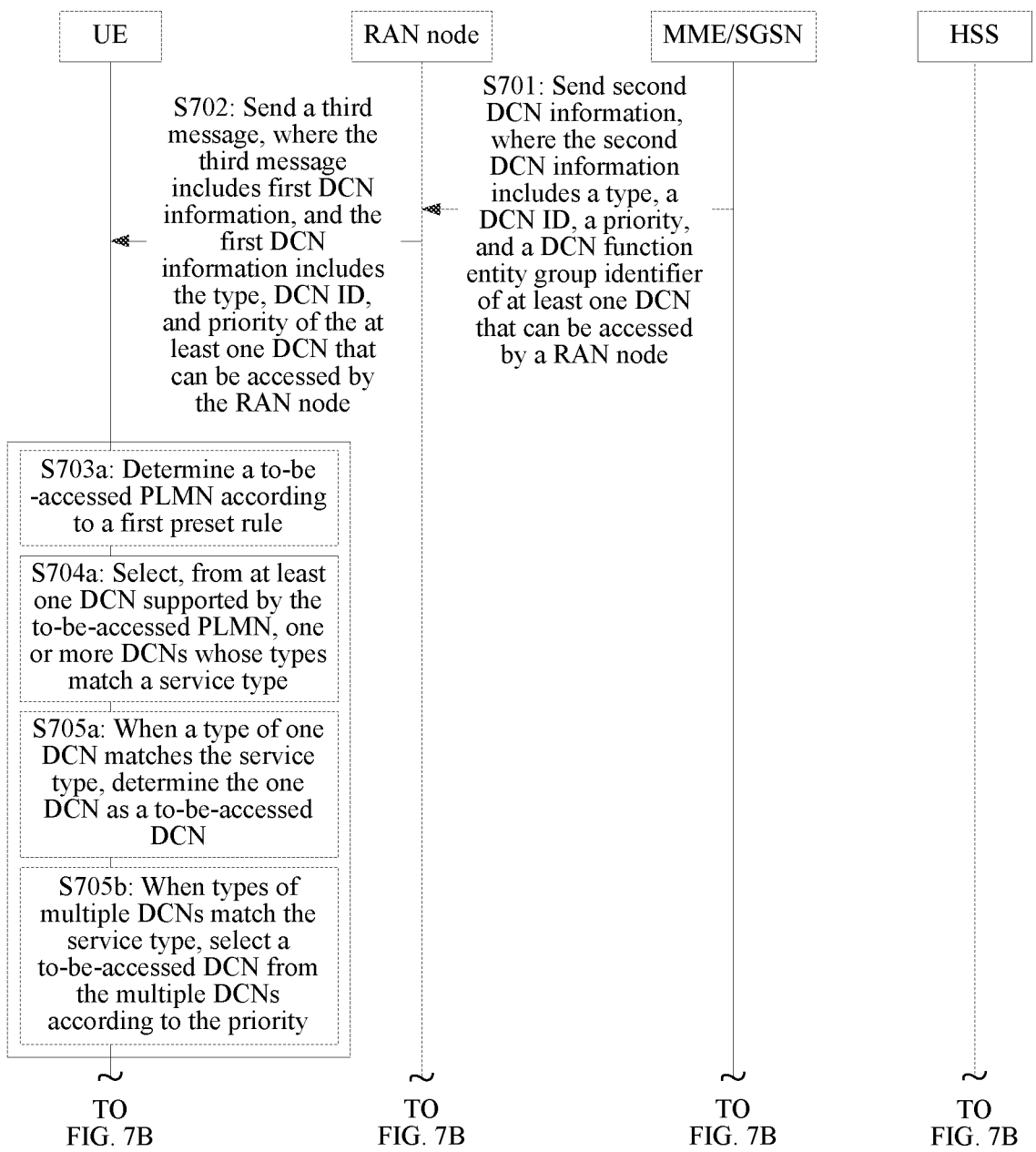
FIG. 7A and FIG. 7B are a flowchart of a seventh embodiment of a core network selection method according to the present invention.
Figure 7B:
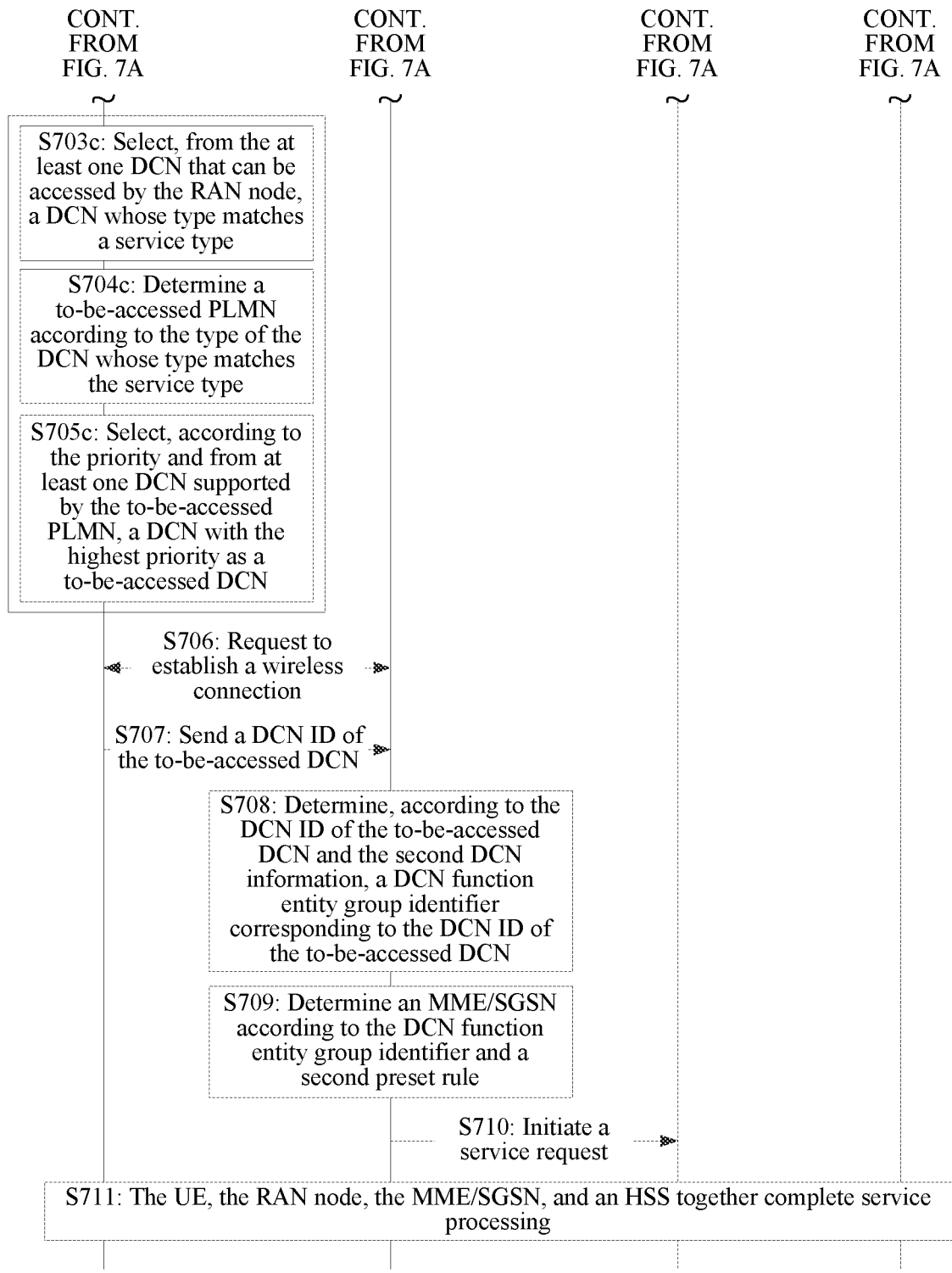

FIG. 7A and FIG. 7B are a flowchart of a seventh embodiment of a core network selection method according to the present invention. As shown in FIG. 7A and FIG. 7B, the method in this embodiment is applicable to a communications system including UE, a RAN node, an MME/SGSN, and an HHS. The MME/SGSN is the foregoing core network device, and the HSS is a core network device that provides a core network user plane function. It should be noted that the method in this embodiment may be applicable to any communications system that includes UE, an access network device, and a core network device. For ease of method embodiment description, the foregoing communications system is merely an example. The method in this embodiment may include the following steps.

S701: The MME/SGSN sends second DCN information to the RAN node, where the second DCN information includes a type, a DCN ID, a priority, and a DCN function entity group identifier of at least one DCN that can be accessed by the RAN node.

A principle of S701 is similar to that of S501, and details are not described herein again.

S702: The RAN node sends a third message to the UE, where the third message includes first DCN information, and the first DCN information includes the type, DCN ID, and priority of the at least one DCN that can be accessed by the RAN node.

A principle of S702 is similar to that of S602. The only difference lies in that, in this embodiment, the first DCN information further includes the DCN ID and priority of the at least one DCN that can be accessed by the RAN node. Details are not described herein again.

The UE may select, according to the broadcast message, a PLMN and a to-be-accessed DCN in either of the two following manners:

S703a: The UE determines the to-be-accessed PLMN according to a first preset rule.

S704a: The UE selects, from at least one DCN supported by the to-be-accessed PLMN, one or more DCNs whose types match a service type.

S704a is similar to S604a, and details are not described herein again.

S705a: When a type of one DCN matches the service type, the UE determines the one DCN as the to-be-accessed DCN.

S705b: When types of multiple DCNs match the service type, the UE selects the to-be-accessed DCN from the multiple DCNs according to the priority.

The UE first performs a PLMN selection process, to select one PLMN ID from multiple PLMN IDs. Then, the UE selects the DCN type and a DCN ID from those of the at least one DCN supported by the PLMN. A principle of a process in which the UE selects the DCN type and the DCN ID is similar to that of S504 to S505b, and details are not described herein again. In this case, the DCN ID may be indicated as a parameter included in information about each PLMN in the broadcast message. That is, the information about each PLMN may include {PLMN ID, {DCN type1, DCN ID1, DCN ID2}, {DCN type2, DCN ID3, DCN ID4}, . . . }.

S703c: The UE selects, from the at least one DCN that can be accessed by the RAN node, a DCN whose type matches a service type.

S704c: The UE determines the to-be-accessed PLMN according to the type of the DCN whose type matches the service type.

S705c: The UE selects, according to the priority and from at least one DCN supported by the to-be-accessed PLMN, a DCN with the highest priority as the to-be-accessed DCN.

The UE first selects, from the at least one DCN that can be accessed by the RAN node, the DCN whose DCN type matches the service type. A principle of a process in which the UE selects the DCN whose type matches the service type is similar to that of S404, and details are not described herein again. Then, the UE selects one PLMN from PLMNs that support the DCN type of the selected DCN, as the to-be-accessed PLMN. The UE further selects, according to the priority and from the at least one DCN supported by the to-be-accessed PLMN, the DCN with the highest priority as the to-be-accessed DCN. DCN IDs corresponding to one PLMN ID may be sequenced according to priorities. The UE preferentially selects a DCN ID with a high priority. In this case, information about each DCN in the broadcast message may include {DCN type, {PLMN ID1, DCN ID1, DCN ID2}, {PLMN ID2, DCN ID3, DCN ID4}, ... }. In this case, information about each DCN in the broadcast message may include {DCN type, {PLMN ID1, PLMN ID2}, ... }. For example, if the UE is used as a common meter, the UE selects a DCN whose DCN type=CIoT, then selects a PLMN ID2 from a PLMN ID1 and the PLMN ID2 that support DCN type=CIoT, and then selects a DCN ID3 from a DCN ID of a DCN supported by the PLMN ID2.

S703a to S705b, and S703c to S705c are alternative steps. The UE can select the PLMN and the to-be-accessed DCN by using either of the two methods.

In addition, when the UE does not find any DCN whose type matches the service type, the UE may select a preset default DCN as the to-be-accessed DCN. The default DCN may be preconfigured by the MME/SGSN for the RAN node, and then the RAN node sends information about the default DCN to the UE by using an RRC connection setup. Alternatively, the UE may send an access termination request to the RAN node, to terminate this connection request process. Alternatively, the UE may perform a process such as PLMN reselection and/or cell reselection, and obtain the first DCN information from another RAN node.

S706: The UE requests, to the RAN node, to establish a wireless connection.

A principle of S706 is similar to that of S605, and details are not described herein again.

S707: The UE sends the DCN ID of the to-be-accessed DCN to the RAN node.

A principle of S707 is similar to that of S506, and details are not described herein again.

S708: The RAN node determines, according to the DCN ID of the to-be-accessed DCN and the second DCN information, a DCN function entity group identifier corresponding to the DCN ID of the to-be-accessed DCN.

A principle of S708 is similar to that of S507, and details are not described herein again.

S709: The RAN node determines the MME/SGSN according to the DCN function entity group identifier and a second preset rule.

A principle of S709 is similar to that of S407, and details are not described herein again.

S710: The RAN node initiates a service request to the MME/SGSN.

S711: The UE, the RAN node, the MME/SGSN, and the HSS together complete service processing.

Principles of S710 and S711 are similar to those of S408 and S409, and details are not described herein again.

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 8:
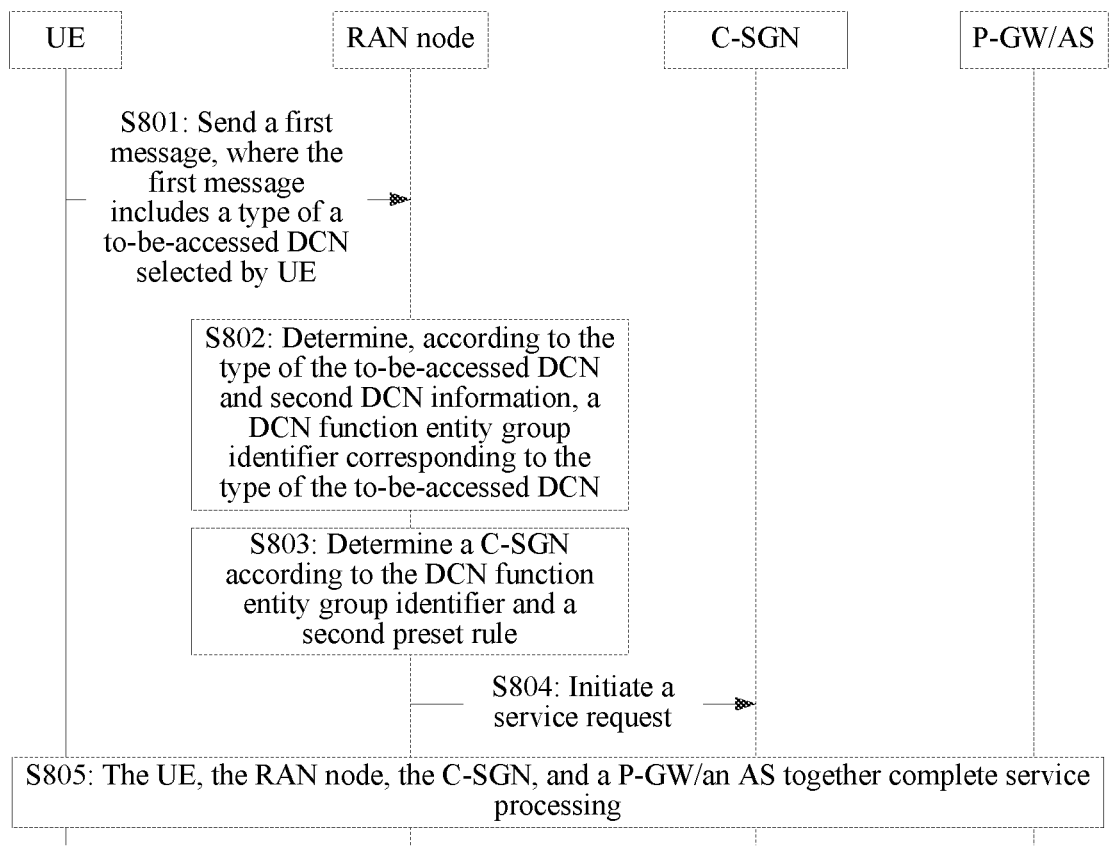
FIG. 8 is a flowchart of an eighth embodiment of a core network selection method according to the present invention.

FIG. 8 is a flowchart of an eighth embodiment of a core network selection method according to the present invention. As shown in FIG. 8, the method in this embodiment is applicable to a communications system including UE, a RAN node, a C-SGN, and a P-GW/an AS. The C-SGN is the foregoing core network device, and the P-GW/AS is a core network device that provides a core network user plane function. It should be noted that the method in this embodiment may be applicable to any communications system that includes UE, an access network device, and a core network device. For ease of method embodiment description, the foregoing communications system is merely an example. The method in this embodiment may include the following steps.

S801: The UE sends a first message to the RAN node, where the first message includes a type of a to-be-accessed DCN selected by the UE.

The UE sends an RRC connection request to the RAN node, where the RRC connection request includes information that DCN type=CIoT. The RRC connection request further carries application-layer small data. The application-layer small data may be encapsulated into a NAS message.

S802: The RAN node determines, according to the type of the to-be-accessed DCN and second DCN information, a DCN function entity group identifier corresponding to the type of the to-be-accessed DCN.

The RAN node determines, according to DCN type=CIoT and information about mapping between a DCN type and a DCN function entity group identifier, the DCN function entity group identifier corresponding to the to-be-accessed DCN whose DCN type=CIoT. If the mapping information includes no DCN function entity group identifier corresponding to DCN type=CIoT, the RAN node may select a default DCN or send an RRC connection reject message (RRC Connection Reject) to the UE, where the RRC connection reject carries a reject cause "no DCN available (No DCN available)", and the RAN node does not perform any subsequent step.

S803: The RAN node determines the C-SGN according to the DCN function entity group identifier and a second preset rule.

The RAN node further selects one function entity, such as an MME in 4G or an SGSN in 3G, in the DCN corresponding to the DCN function entity group identifier, as the core network device.

S804: The RAN node initiates a service request to the C-SGN.

S805: The UE, the RAN node, the C-SGN, and the P-GW/AS together complete service processing.

The RAN node extracts a NAS message into which the application-layer small data is encapsulated in the RRC connection request message, and sends the NAS message to the C-SGN. The C-SGN sends the application-layer small data to the packet data network gateway (Packet Data Network Gateway, P-GW for short) or the application server (Application Server, AS for short).

According to this embodiment, UE selects a to-be-accessed DCN according to a service type of the UE, so as to implement accurate selection of a core network device by an access network device, improve accuracy of DCN selection by the access network device, avoid a communication signaling increase and a processing delay in a DCN reselection process, and improve communication efficiency.

Figure 9:
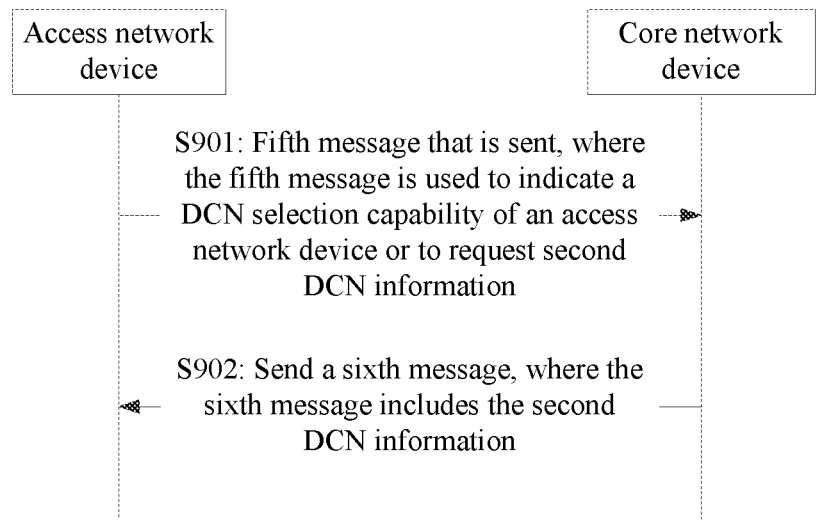
FIG. 9 is a flowchart of a ninth embodiment of a core network selection method according to the present invention.

FIG. 9 is a flowchart of a ninth embodiment of a core network selection method according to the present invention. As shown in FIG. 9, the method in this embodiment is applicable to a communications system including an access network device and a core network device. The method in this embodiment may include the following steps.

S901: The core network device receives a fifth message sent by the access network device, where the fifth message is used to indicate a DCN selection capability of the access network device or to request the second DCN information.

The fifth message is an S1 setup request message (S1 Setup Request) or an uplink information exchange request message (Uplink Information Exchange Request).

S902: The core network device sends a sixth message to the access network device, where the sixth message includes the second DCN information.

The sixth message is an S1 setup response message (S1 Setup Response) or an uplink information exchange response message (Uplink Information Exchange Response).

Figure 10:
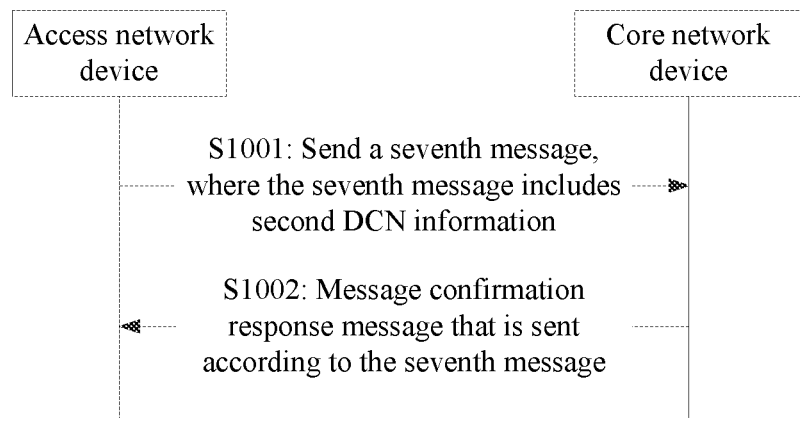
FIG. 10 is a flowchart of a tenth embodiment of a core network selection method according to the present invention.

FIG. 10 is a flowchart of a tenth embodiment of a core network selection method according to the present invention. As shown in FIG. 10, the method in this embodiment is applicable to a communications system including an access network device and a core network device. The method in this embodiment may include the following steps.

S1001: The core network device sends a seventh message to the access network device, where the seventh message includes the second DCN information.

The seventh message is a mobility management entity MME configuration update message (MME Configuration Update) or an information transfer indication message (Information Transfer Indication).

S1002: The core network device receives a message confirmation response message that is sent by the access network device according to the seventh message.

The message confirmation response message may be an MME configuration update acknowledgement response (MME Configuration Update Acknowledge) or an information transfer confirmation (Information Transfer Confirmation).

Figure 11:
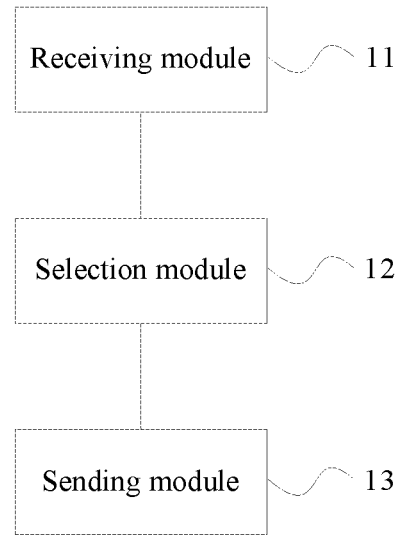
FIG. 11 is a schematic structural diagram of an embodiment of UE according to the present invention.

FIG. 11 is a schematic structural diagram of an embodiment of UE according to the present invention. As shown in FIG. 11, the apparatus in this embodiment may include a receiving module 11, a selection module 12, and a sending module 13. The receiving module 11 is configured to obtain first dedicated core network DCN information from an access network device, where the first DCN information includes information about at least one DCN that can be accessed by the access network device. The selection module 12 is configured to select a to-be-accessed DCN from the at least one DCN according to the first DCN information. The sending module 13 is configured to send information about the to-be-accessed DCN to the access network device, so that the access network device determines a core network device according to the information about the to-be-accessed DCN.

The apparatus in this embodiment may be configured to implement the technical solution in any one of the method embodiments in FIG. 1 and FIG. 4 to FIG. 8. Implementation principles and technical effects of the apparatus are similar to those in the method embodiments in FIG. 1 and FIG. 4 to FIG. 8, and details are not described herein again.

Further, the first DCN information includes a type of the at least one DCN. The selection module 12 is specifically configured to select, from the at least one DCN, a DCN whose type matches a service type of the user equipment UE, as the to-be-accessed DCN. The sending module 13 is specifically configured to send the type of the to-be-accessed DCN to the access network device, so that the access network device determines the core network device according to the type of the to-be-accessed DCN.

Further, the first DCN information includes a type, a DCN identity ID, and a priority of the at least one DCN. The selection module 12 is specifically configured to: select, from the at least one DCN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority. The sending module 13 is specifically configured to send a DCN ID of the to-be-accessed DCN to the access network device, so that the access network device determines the core network device according to the DCN ID of the to-be-accessed DCN.

Further, the sending module 13 is further configured to send a first message to the access network device, where the first message is used to indicate a DCN selection capability of the UE. The receiving module 11 is specifically configured to receive a second message that is sent by the access network device according to the first message, where the second message includes the first DCN information.

Further, the first DCN information includes a type of the at least one DCN. The selection module 12 is specifically configured to determine a to-be-accessed public land mobile network PLMN according to a first preset rule, and select, from at least one DCN supported by the to-be-accessed PLMN, a DCN whose type matches a service type of the UE, as the to-be-accessed DCN. The sending module 13 is specifically configured to send the type of the to-be-accessed DCN to the access network device, so that the access network device determines the core network device according to the type of the to-be-accessed DCN.

Further, the first DCN information includes a type of the at least one DCN. The selection module 12 is specifically configured to select, from the at least one DCN, a DCN whose type matches a service type of the UE, as the to-be-accessed DCN, and determine a to-be-accessed PLMN according to the type of the to-be-accessed DCN. The sending module 13 is specifically configured to send the type of the to-be-accessed DCN to the access network device, so that the access network device determines the core network device according to the type of the to-be-accessed DCN.

Further, the first DCN information includes a type, a DCN ID, and a priority of the at least one DCN. The selection module 12 is specifically configured to: determine a to-be-accessed PLMN according to a first preset rule; select, from at least one DCN supported by the to-be-accessed PLMN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority. The sending module 13 is specifically configured to send a DCN ID of the to-be-accessed DCN to the access network device, so that the access network device determines the core network device according to the DCN ID of the to-be-accessed DCN.

Further, the first DCN information includes a type, a DCN ID, and a priority of the at least one DCN. The selection module 12 is specifically configured to select, from the at least one DCN, a DCN whose type matches a service type of the UE, determine a to-be-accessed PLMN according to the type of the DCN whose type matches the service type of the UE, and select, according to the priority and from at least one DCN supported by the to-be-accessed PLMN, a DCN with the highest priority as the to-be-accessed DCN. The sending module 13 is specifically configured to send a DCN ID of the to-be-accessed DCN to the access network device, so that the access network device determines the core network device according to the DCN ID of the to-be-accessed DCN.

Further, the receiving module 11 is specifically configured to receive a third message sent by the access network device, where the third message includes the first DCN information.

Further, the sending module 13 is further configured to request, to the access network device, to establish a wireless connection.

Further, the selection module 12 is further configured to: select a preset default DCN as the to-be-accessed DCN when the at least one DCN includes no DCN whose type matches the service type; or send an access termination request to the access network device when the at least one DCN includes no DCN whose type matches the service type; or obtain the first DCN information from another access network device when the at least one DCN includes no DCN whose type matches the service type.

Figure 12:
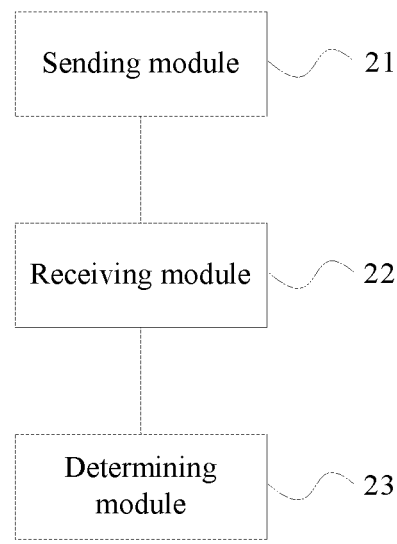
FIG. 12 is a schematic structural diagram of an embodiment of an access network device according to the present invention.

FIG. 12 is a schematic structural diagram of an embodiment of an access network device according to the present invention. As shown in FIG. 12, the apparatus in this embodiment may include a sending module 21, a receiving module 22, and a determining module 23. The sending module 21 is configured to send first dedicated core network DCN information to user equipment UE, so that the UE selects a to-be-accessed DCN according to the first DCN information, where the first DCN information includes information about at least one DCN that can be accessed by the access network device. The receiving module 22 is configured to receive information about the to-be-accessed DCN sent by the UE. The determining module 23 is configured to determine a core network device according to the information about the to-be-accessed DCN and preconfigured second DCN information, and initiate a service request to the core network device.

The apparatus in this embodiment may be configured to implement the technical solution in any one of the method embodiments in FIG. 2 and FIG. 4 to FIG. 10. Implementation principles and technical effects of the apparatus are similar to those in the method embodiments in FIG. 2 and FIG. 4 to FIG. 10, and details are not described herein again.

Further, the information about the to-be-accessed DCN includes a type of the to-be-accessed DCN. The determining module 23 is specifically configured to determine, according to the type of the to-be-accessed DCN and the second DCN information, a DCN function entity group identifier corresponding to the type of the to-be-accessed DCN, and determine the core network device according to the DCN function entity group identifier and a second preset rule.

Further, the determining module 23 is further configured to: determine a preset default core network device as the core network device when no DCN function entity group identifier corresponding to the type of the to-be-accessed DCN is determined according to the type of the to-be-accessed DCN and the second DCN information; or send a fourth message to the UE when no DCN function entity group identifier corresponding to the type of the to-be-accessed DCN is determined according to the type of the to-be-accessed DCN and the second DCN information, where the fourth message is used to terminate an access request.

Further, the information about the to-be-accessed DCN includes a DCN ID of the to-be-accessed DCN. The determining module 23 is specifically configured to determine, according to the DCN ID of the to-be-accessed DCN and the second DCN information, a DCN function entity group identifier corresponding to the to-be-accessed DCN, and determine the core network device according to the DCN function entity group identifier and a second preset rule.

Further, the determining module 23 is further configured to: determine a preset default core network device as the core network device when no DCN function entity group identifier corresponding to the DCN ID of the to-be-accessed DCN is determined according to the DCN ID of the to-be-accessed DCN and the second DCN information; or send a fourth message to the UE when no DCN function entity group identifier corresponding to the DCN ID of the to-be-accessed DCN is determined according to the DCN ID of the to-be-accessed DCN and the second DCN information, where the fourth message is used to terminate an access request.

Further, the receiving module 22 is further configured to obtain the second DCN information from the core network device, where the second DCN information includes a type and a DCN function entity group identifier of the at least one DCN.

Further, the second DCN information further includes a DCN ID and a priority of the at least one DCN.

Further, the receiving module 22 is further configured to receive a first message sent by the UE, where the first message is used to indicate a DCN selection capability of the UE. The sending module 21 is specifically configured to send a second message to the UE according to the first message, where the second message includes the first DCN information.

Further, the sending module 21 is specifically configured to send a third message to the UE, where the third message includes the first DCN information.

Figure 13:
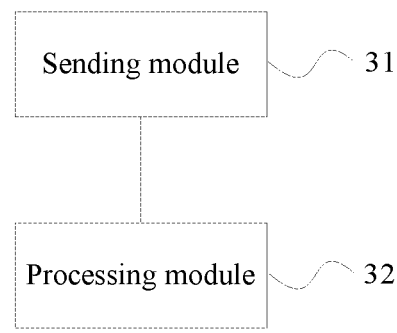
FIG. 13 is a schematic structural diagram of an embodiment of a core network device according to the present invention.

FIG. 13 is a schematic structural diagram of an embodiment of a core network device according to the present invention. As shown in FIG. 13, the apparatus in this embodiment may include a sending module 31 and a processing module 32. The sending module 31 is configured to send second dedicated core network DCN information to an access network device, so that the access network device determines the core network device according to the second DCN information. The processing module 32 is configured to process a service request initiated by the access network device.

The apparatus in this embodiment may be configured to implement the technical solution in any one of the method embodiments in FIG. 3 and FIG. 4 to FIG. 10. Implementation principles and technical effects of the apparatus are similar to those in the method embodiments in FIG. 3 and FIG. 4 to FIG. 10, and details are not described herein again.

Further, the second DCN information includes a type and a DCN function entity group identifier of at least one DCN.

Further, the second DCN information further includes a DCN ID and a priority of the at least one DCN.

Figure 14:
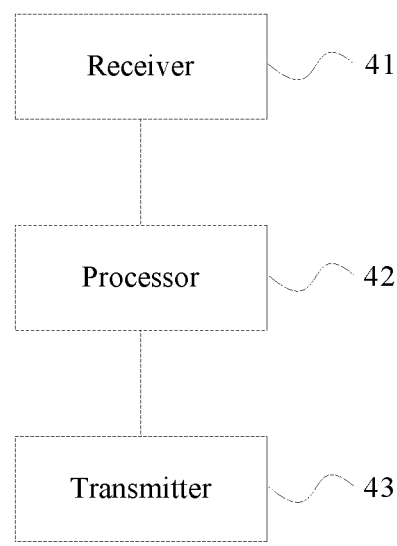
FIG. 14 is a schematic structural diagram of another embodiment of UE according to the present invention.

FIG. 14 is a schematic structural diagram of another embodiment of UE according to the present invention. As shown in FIG. 14, the apparatus in this embodiment may include a receiver 41, a processor 42, and a transmitter 43. The receiver 41 is configured to obtain first dedicated core network DCN information from an access network device, where the first DCN information includes information about at least one DCN that can be accessed by the access network device. The processor 42 is configured to select a to-be-accessed DCN from the at least one DCN according to the first DCN information. The transmitter 43 is configured to send information about the to-be-accessed DCN to the access network device, so that the access network device determines a core network device according to the information about the to-be-accessed DCN.

The apparatus in this embodiment may be configured to implement the technical solution in any one of the method embodiments in FIG. 1 and FIG. 4 to FIG. 8. Implementation principles and technical effects of the apparatus are similar to those in the method embodiments in FIG. 1 and FIG. 4 to FIG. 8, and details are not described herein again.

Further, the first DCN information includes a type of the at least one DCN. The processor 42 is specifically configured to select, from the at least one DCN, a DCN whose type matches a service type of the user equipment UE, as the to-be-accessed DCN. The transmitter 43 is specifically configured to send the type of the to-be-accessed DCN to the access network device, so that the access network device determines the core network device according to the type of the to-be-accessed DCN.

Further, the first DCN information includes a type, a DCN identity ID, and a priority of the at least one DCN. The processor 42 is specifically configured to: select, from the at least one DCN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority. The transmitter 43 is specifically configured to send a DCN ID of the to-be-accessed DCN to the access network device, so that the access network device determines the core network device according to the DCN ID of the to-be-accessed DCN.

Further, the transmitter 43 is further configured to send a first message to the access network device, where the first message is used to indicate a DCN selection capability of the UE. The receiver 41 is specifically configured to receive a second message that is sent by the access network device according to the first message, where the second message includes the first DCN information.

Further, the first DCN information includes a type of the at least one DCN. The processor 42 is specifically configured to determine a to-be-accessed public land mobile network PLMN according to a first preset rule, and select, from at least one DCN supported by the to-be-accessed PLMN, a DCN whose type matches a service type of the UE, as the to-be-accessed DCN. The transmitter 43 is specifically configured to send the type of the to-be-accessed DCN to the access network device, so that the access network device determines the core network device according to the type of the to-be-accessed DCN.

Further, the first DCN information includes a type of the at least one DCN. The processor 42 is specifically configured to select, from the at least one DCN, a DCN whose type matches a service type of the UE, as the to-be-accessed DCN, and determine a to-be-accessed PLMN according to the type of the to-be-accessed DCN. The transmitter 43 is specifically configured to send the type of the to-be-accessed DCN to the access network device, so that the access network device determines the core network device according to the type of the to-be-accessed DCN.

Further, the first DCN information includes a type, a DCN ID, and a priority of the at least one DCN. The processor 42 is specifically configured to: determine a to-be-accessed PLMN according to a first preset rule; select, from at least one DCN supported by the to-be-accessed PLMN, one or more DCNs whose types match a service type of the UE; and when a type of one DCN matches the service type, determine the one DCN as the to-be-accessed DCN; or when types of multiple DCNs match the service type, select the to-be-accessed DCN from the multiple DCNs according to the priority. The transmitter 43 is specifically configured to send a DCN ID of the to-be-accessed DCN to the access network device, so that the access network device determines the core network device according to the DCN ID of the to-be-accessed DCN.

Further, the first DCN information includes a type, a DCN ID, and a priority of the at least one DCN. The processor 42 is specifically configured to select, from the at least one DCN, a DCN whose type matches a service type of the UE, determine a to-be-accessed PLMN according to the type of the DCN whose type matches the service type of the UE, and select, according to the priority and from at least one DCN supported by the to-be-accessed PLMN, a DCN with the highest priority as the to-be-accessed DCN. The transmitter 43 is specifically configured to send a DCN ID of the to-be-accessed DCN to the access network device, so that the access network device determines the core network device according to the DCN ID of the to-be-accessed DCN.

Further, the receiver 41 is specifically configured to receive a third message sent by the access network device, where the third message includes the first DCN information.

Further, the transmitter 43 is further configured to request, to the access network device, to establish a wireless connection.

Further, the processor 42 is further configured to: select a preset default DCN as the to-be-accessed DCN when the at least one DCN includes no DCN whose type matches the service type; or send an access termination request to the access network device when the at least one DCN includes no DCN whose type matches the service type; or obtain the first DCN information from another access network device when the at least one DCN includes no DCN whose type matches the service type.

Figure 15:
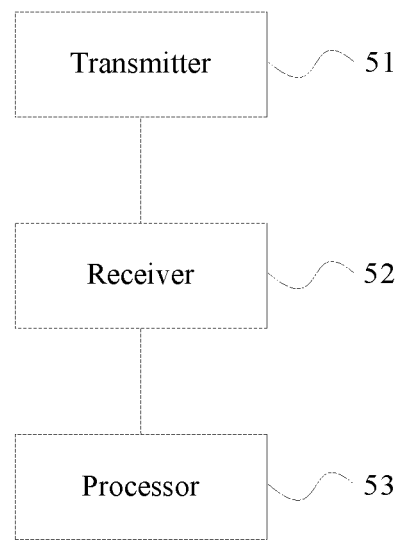
FIG. 15 is a schematic structural diagram of another embodiment of an access network device according to the present invention.

FIG. 15 is a schematic structural diagram of another embodiment of an access network device according to the present invention. As shown in FIG. 15, the apparatus in this embodiment may include a transmitter 51, a receiver 52, and a processor 53. The transmitter 51 is configured to send first dedicated core network DCN information to user equipment UE, so that the UE selects a to-be-accessed DCN according to the first DCN information, where the first DCN information includes information about at least one DCN that can be accessed by the access network device. The receiver 52 is configured to receive information about the to-be-accessed DCN sent by the UE. The processor 53 is configured to determine a core network device according to the information about the to-be-accessed DCN and preconfigured second DCN information, and initiate a service request to the core network device.

The apparatus in this embodiment may be configured to implement the technical solution in any one of the method embodiments in FIG. 2 and FIG. 4 to FIG. 10. Implementation principles and technical effects of the apparatus are similar to those in the method embodiments in FIG. 2 and FIG. 4 to FIG. 10, and details are not described herein again.

Further, the information about the to-be-accessed DCN includes a type of the to-be-accessed DCN. The processor 53 is specifically configured to determine, according to the type of the to-be-accessed DCN and the second DCN information, a DCN function entity group identifier corresponding to the type of the to-be-accessed DCN, and determine the core network device according to the DCN function entity group identifier and a second preset rule.

Further, the processor 53 is further configured to: determine a preset default core network device as the core network device when no DCN function entity group identifier corresponding to the type of the to-be-accessed DCN is determined according to the type of the to-be-accessed DCN and the second DCN information; or send a fourth message to the UE when no DCN function entity group identifier corresponding to the type of the to-be-accessed DCN is determined according to the type of the to-be-accessed DCN and the second DCN information, where the fourth message is used to terminate an access request.

Further, the information about the to-be-accessed DCN includes a DCN ID of the to-be-accessed DCN. The processor 53 is specifically configured to determine, according to the DCN ID of the to-be-accessed DCN and the second DCN information, a DCN function entity group identifier corresponding to the to-be-accessed DCN, and determine the core network device according to the DCN function entity group identifier and a second preset rule.

Further, the processor 53 is further configured to: determine a preset default core network device as the core network device when no DCN function entity group identifier corresponding to the DCN ID of the to-be-accessed DCN is determined according to the DCN ID of the to-be-accessed DCN and the second DCN information; or send a fourth message to the UE when no DCN function entity group identifier corresponding to the DCN ID of the to-be-accessed DCN is determined according to the DCN ID of the to-be-accessed DCN and the second DCN information, where the fourth message is used to terminate an access request.

Further, the receiver 52 is further configured to obtain the second DCN information from the core network device, where the second DCN information includes a type and a DCN function entity group identifier of the at least one DCN.

Further, the second DCN information further includes a DCN ID and a priority of the at least one DCN.

Further, the receiver 52 is further configured to receive a first message sent by the UE, where the first message is used to indicate a DCN selection capability of the UE. The transmitter 51 is specifically configured to send a second message to the UE according to the first message, where the second message includes the first DCN information.

Further, the transmitter 51 is specifically configured to send a third message to the UE, where the third message includes the first DCN information.

Figure 16:
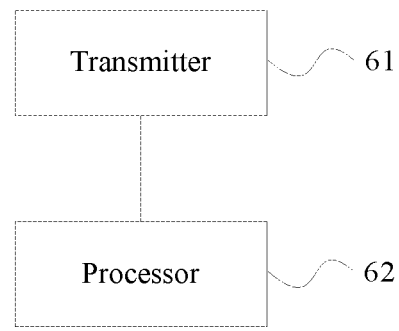
FIG. 16 is a schematic structural diagram of another embodiment of a core network device according to the present invention.

FIG. 16 is a schematic structural diagram of another embodiment of a core network device according to the present invention. As shown in FIG. 16, the apparatus in this embodiment may include a transmitter 61 and a processor 62. The transmitter 61 is configured to send second dedicated core network DCN information to an access network device, so that the access network device determines the core network device according to the second DCN information. The processor 62 is configured to process a service request initiated by the access network device.

The apparatus in this embodiment may be configured to implement the technical solution in any one of the method embodiments in FIG. 3 and FIG. 4 to FIG. 10. Implementation principles and technical effects of the apparatus are similar to those in the method embodiments in FIG. 3 and FIG. 4 to FIG. 10, and details are not described herein again.

Further, the second DCN information includes a type and a DCN function entity group identifier of at least one DCN.

Further, the second DCN information further includes a DCN ID and a priority of the at least one DCN.

Figure 17:
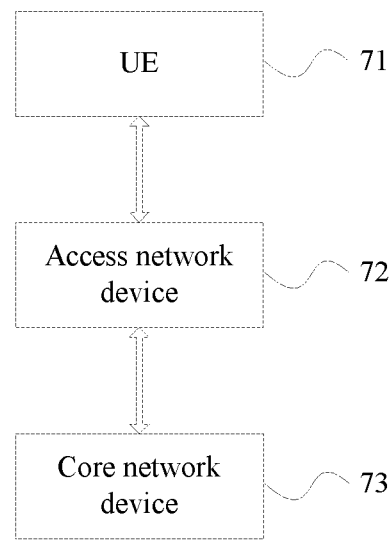
FIG. 17 is a schematic structural diagram of an embodiment of a communications system according to the present invention.

FIG. 17 is a schematic structural diagram of an embodiment of a communications system according to the present invention. As shown in FIG. 17, the system in this embodiment includes UE 71, an access network device 72, and a core network device 73. The UE 71 may use a structure in the apparatus embodiment shown in FIG. 11. Correspondingly, the UE 71 may implement the technical solution in any one of the method embodiments in FIG. 1 and FIG. 4 to FIG. 8. Implementation principles and technical effects of the UE 71 are similar to those in the method embodiments in FIG. 1 and FIG. 4 to FIG. 8, and details are not described herein again. The access network device 72 may use a structure in the apparatus embodiment shown in FIG. 12. Correspondingly, the access network device 72 may implement the technical solution in any one of the method embodiments in FIG. 2 and FIG. 4 to FIG. 10. Implementation principles and technical effects of the access network device 72 are similar to those in the method embodiments in FIG. 2 and FIG. 4 to FIG. 10, and details are not described herein again. The core network device 73 may use a structure in the apparatus embodiment shown in FIG. 13. Correspondingly, the core network device 73 may implement the technical solution in any one of the method embodiments in FIG. 3 and FIG. 4 to FIG. 10. Implementation principles and technical effects of the core network device 73 are similar to those in the method embodiments in FIG. 3 and FIG. 4 to FIG. 10, and details are not described herein again.

Further, the UE 71 in the system structure shown in FIG. 17 may use a structure in the apparatus embodiment shown in FIG. 14. Correspondingly, the UE 71 may implement the technical solution in any one of the method embodiments in FIG. 1 and FIG. 4 to FIG. 8. Implementation principles and technical effects of the UE 71 are similar to those in the method embodiments in FIG. 1 and FIG. 4 to FIG. 8, and details are not described herein again. The access network device 72 may use a structure in the apparatus embodiment shown in FIG. 15. Correspondingly, the access network device 72 may implement the technical solution in any one of the method embodiments in FIG. 2 and FIG. 4 to FIG. 10. Implementation principles and technical effects of the access network device 72 are similar to those in the method embodiments in FIG. 2 and FIG. 4 to FIG. 10, and details are not described herein again. The core network device 73 may use a structure in the apparatus embodiment shown in FIG. 16. Correspondingly, the core network device 73 may implement the technical solution in any one of the method embodiments in FIG. 3 and FIG. 4 to FIG. 10. Implementation principles and technical effects of the core network device 73 are similar to those in the method embodiments in FIG. 3 and FIG. 4 to FIG. 10, and details are not described herein again.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected according to actual needs, to achieve the objectives of the solutions in the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software function unit.

When the foregoing integrated unit is implemented in the form of a software function unit, the integrated unit may be stored in a computer-readable storage medium. The software function unit is stored in a storage medium and includes several instructions for instructing a computer device (which may be a personal computer, a server, a network device, or the like) or a processor (processor) to perform a part of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for convenience and briefness of description, only the division of the foregoing function modules is used as an example for illustration. In actual application, the foregoing functions may be allocated, according to a need, to different function modules for implementation. That is, an inner structure of an apparatus is divided into different function modules, to implement all or a part of the functions described above. For a specific working process of the foregoing apparatus, refer to a corresponding process in the foregoing method embodiments, and details are not described herein again.

Finally, it should be noted that the foregoing embodiments are merely intended for describing the technical solutions in the present invention, but are not intended for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present invention.

What is claimed:

1. A method, implemented by user equipment, comprising:
    determining first information about a first network slice that the user equipment wishes to access, wherein the first information comprises a type of the first network slice,
        wherein when the user equipment has second information comprising at least one network slice type obtained from a network device, the first information comprises the second information or a subset of the second information, and
        wherein when the user equipment does not have the second information, the first information comprises a default configured information or a subset of the default configured information; and
    sending the first information to an access network device.

2. The method according to claim 1, wherein the first information is used for determination of a core network device.

3. The method according to claim 1, wherein a public land mobile network (PLMN) that the user equipment wishes to access supports the first network slice.

4. The method according to claim 1, wherein the first information further comprises:
    information for differentiating multiple network slices with same type.

5. The method according to claim 1, wherein the default configured information is associated with a public land mobile network (PLMN).

6. The method according to claim 1, wherein the type of the first network slice matches a service that the user equipment wishes to use.

7. The method according to claim 1, wherein the method further comprises:
    requesting, to the access network device, to establish a wireless connection.

8. The method according to claim 1, wherein the second information comprises allowed information from the network device or configured information from the network device.

9. A user equipment, comprising
    at least one processor; and
    a memory configured to store program code, wherein
    the at least one processer is configured to run the program code, causing the user equipment to execute the steps of:
    determining first information about a first network slice that the user equipment wishes to access, wherein the first information comprises a type of the first network slice,
        wherein when the user equipment has second information comprising at least one network slice type obtained from a network device, the first information comprises the second information or a subset of the second information, and
        wherein when the user equipment does not have the second information, the first information comprises a default configured information or a subset of the default configured information; and
    sending the first information to an access network device.

10. The user equipment according to claim 9, wherein the first information is used for determination of a core network device.

11. The user equipment according to claim 9, wherein a public land mobile network (PLMN) that the apparatus wishes to access supports the first network slice.

12. The user equipment according to claim 9, wherein the type of the first network slice matches a service that the user equipment wishes to use.

13. A non-transitory computer-readable medium storing computer instructions for a computer or mobile device, that when the computer instructions are executed by one or more processors, cause the one or more processors to perform the steps of:
    determining first information about a first network slice that the user equipment wishes to access, wherein the first information comprises a type of the first network slice,
        wherein when the user equipment has second information comprising at least one network slice type obtained from a network device, the first information comprises the second information or a subset of the second information, and
        wherein when the user equipment does not have the second information, the first information comprises a default configured information or a subset of the default configured information; and
    sending the first information to an access network device wherein.

14. The non-transitory computer-readable medium according to claim 13, wherein the first information further comprises:
    information for differentiating multiple network slices with same type.

15. The non-transitory computer-readable medium according to claim 13, wherein the default configured information is associated with a public land mobile network (PLMN).

16. The non-transitory computer-readable medium according to claim 13, wherein the type of the first network slice matches a service that the user equipment wishes to use.

17. The non-transitory computer-readable medium according to claim 13, wherein the first information comprises the default configured information or the subset of the default configured information, and the determining the first information comprises:
- obtaining the second information from the network device, wherein the second information comprises at least one network slice type; and
- determining the first information to comprise the default configured information in response to each of the at least one network slice type not matching a service that the user equipment wishes to use or in response to a public land mobile network (PLMN) that the user equipment wishes to access not supporting each of the at least one network slice type.

* * * * *